United States Patent
Lazo et al.

(10) Patent No.: US 10,317,746 B2
(45) Date of Patent: Jun. 11, 2019

(54) LIQUID CRYSTAL DISPLAY DEVICE

(71) Applicant: SAMSUNG DISPLAY CO., LTD., Yongin-si, Gyeonggi-do (KR)

(72) Inventors: Israel Esteban Lazo, Hwaseong-si (KR); Heung Shik Park, Seoul (KR); Ki Chul Shin, Seongnam-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/483,108

(22) Filed: Apr. 10, 2017

(65) Prior Publication Data

US 2018/0046038 A1 Feb. 15, 2018

(30) Foreign Application Priority Data

Aug. 10, 2016 (KR) ........................ 10-2016-0101700

(51) Int. Cl.
*G02F 1/1343* (2006.01)
*G02F 1/1337* (2006.01)
*G02F 1/1362* (2006.01)

(52) U.S. Cl.
CPC .. *G02F 1/134309* (2013.01); *G02F 1/133707* (2013.01); *G02F 1/133753* (2013.01); *G02F 1/134336* (2013.01); *G02F 2001/13629* (2013.01); *G02F 2001/133776* (2013.01); *G02F 2201/123* (2013.01)

(58) Field of Classification Search
CPC ......... G02F 1/134309; G02F 1/134336; G02F 1/136286; G02F 1/136227; G02F 1/1339; G02F 1/13394; G02F 1/133707; G02F 1/133711; G02F 1/133723; G02F 1/133753; G02F 2001/134345; G02F 2001/133761; G02F 2201/123; G02F 2201/124; G02F 2201/128
See application file for complete search history.

(56) References Cited

U.S. PATENT DOCUMENTS

| | | | |
|---|---|---|---|
| 9,087,490 B2 | 7/2015 | Kim et al. | |
| 2010/0214502 A1* | 8/2010 | Lee | G02F 1/133707 349/33 |
| 2011/0242468 A1* | 10/2011 | Choi | C08G 8/12 349/129 |

* cited by examiner

*Primary Examiner* — Angela K Davison
(74) *Attorney, Agent, or Firm* — Lee & Morse, P.C.

(57) ABSTRACT

A liquid crystal display device includes a pixel electrode having a stem electrode in a first direction and a plurality of branch electrode extending from the stem electrode. An angle between the stem electrode and each of the branch electrode increases as the branch electrodes approach a center of the stem electrode and the angle decreases as the branch electrodes approach an end of the stem electrode.

20 Claims, 18 Drawing Sheets

LIQUID CRYSTAL DISPLAY DEVICE

CROSS-REFERENCE TO RELATED APPLICATION

Korean Patent Application No. 10-2016-0101700, filed on Aug. 10, 2016, and entitled, "Liquid Crystal Display Device," is incorporated by reference herein in its entirety.

BACKGROUND

1. Field

One or more embodiments described herein relate to a liquid crystal display device.

2. Description of the Related Art

A liquid crystal display device is one of the most widely used flat panel display devices. This type of display device includes a liquid crystal layer between the two substrates that respectively include a pixel electrode and a common electrode. When voltages are applied to the electrodes, an electric field is generated in the liquid crystal layer. The electric field controls the direction of liquid crystal molecules in the liquid crystal layer and the polarization of incident light, thereby forming an image.

Among liquid crystal devices, a vertically aligned liquid crystal display device, in which the major axes of liquid crystal molecules are arranged in a direction perpendicular to upper and lower substrates, has been developed.

The vertically aligned liquid crystal display device may have poorer lateral visibility than front visibility. Specifically, when the liquid crystal display device is viewed from the lateral side, the liquid crystal display device may be viewed further brighter compared to when viewed from the front side. In this case, as the difference in brightness between the front side and the lateral side increases, visibility deteriorates.

Therefore, the vertically aligned liquid crystal display device requires a structure capable of improving visibility by minimizing the difference in brightness between the front side and the lateral side.

SUMMARY

In accordance with one or more embodiments, a liquid crystal display device includes a substrate; and a pixel electrode on the substrate and including a stem electrode extending along a first direction and a plurality of branch electrode extending from the stem electrode, wherein the branch electrodes extend such that an angle between the stem electrode and each of the branch electrode increases as the branch electrodes approach a center of the stem electrode and the angle decreases as the branch electrodes approach an end of the stem electrode.

The branch electrode closest to the center of the stem electrode may extend in a second direction crossing the first direction. A minimum angle between the stem electrode and each of the branch electrode is 0° to 15° and a maximum angle therebetween may be 35° to 45°. The pixel electrode may include a connection electrode connecting ends of some of the branch electrodes to each other and extending in the first direction and the connection electrode may extend from the branch electrode closest to the center of the stem electrode.

The pixel electrode may include a first edge electrode and a second edge electrode, the first edge electrode may be connected with different ends of the stem electrode and extends along an edge of the pixel electrode in a second direction crossing the first direction, and the second edge electrode may be connected with different ends of the first edge electrode and extends along an edge of the pixel electrode in the first direction.

The liquid crystal display device may include an insulation film between the substrate and the pixel electrode, wherein the insulation film includes a first portion having an upper surface that is substantially flat and a second portion protruding in a direction crossing the upper surface of the first portion and partially overlapping the first edge electrode. A section of the second portion cut in the first direction may have a trapezoidal shape having an upper surface that is substantially flat and may have a rectangular shape in a plan view.

In the section of the second portion cut in the first direction, a length of a bottom side may be 4 μm to 6 μm, a height may be 1 μm to 2 μm, and an angle between a lateral side and the bottom side may be 40° to 80°. The second portion may be on an extension line of the stem electrode.

The liquid crystal display device may include a gate line and a data line between the substrate and the insulation film and insulated from each other, wherein the gate line extends in a second direction crossing to the first direction and wherein the data line extends in the first direction. The pixel electrode may be divided into four quadrants having a same shape and may be over a first domain at a right upper end, a second domain at a left upper end, a third domain at a left lower end, and a fourth domain at a right lower end, the branch electrodes in the first domain may extend toward the right lower end, the branch electrodes in the second domain may extend toward the left lower end, the branch electrodes in the third domain may extend toward the left upper end, and the branch electrodes in the fourth domain may extend toward the right upper end.

The pixel electrode may include a connection electrode connecting ends of some of the branch electrodes to each other, the connection electrode may extend upward from the branch electrode at the lowermost end of the first domain, may extend upward from the branch electrode at the lowermost end of the second domain, may extend downward from the branch electrode at the uppermost end of the third domain, and may extend downward from the branch electrode at the uppermost end of the fourth domain. A number of the branch electrodes connected by the connection electrode in each of the first to fourth domains may be 75% or less than a number of the branch electrodes in each of the first to fourth domains.

In accordance with one or more other embodiments, a liquid crystal display device a substrate; and a pixel electrode on the substrate and including a stem electrode extending along a first direction and a plurality of branch electrodes extending from the stem electrode, wherein a branch electrode closest to a center of the stem electrode extends in a second direction crossing to the first direction, and wherein a distance between two adjacent branch electrodes spaced apart from each other along the first direction increases approaching the stem electrode and decreases approaching ends of the branch electrodes.

The two adjacent branch electrode may be spaced apart from each other by a first length at a point at which the branch electrodes contact the stem electrode, the two adjacent branch electrode may be spaced apart by a second length at ends of the branch electrodes, and the first length may be greater than the second length. The pixel electrode may include a connection electrode connecting ends of some of the branch electrodes each other and extending in the first direction, and the connection electrode may extend from the branch electrode closest to the center of the stem electrode.

The pixel electrode may include a first edge electrode and a second edge electrode, the first edge electrode may be connected with different ends of the stem electrode and extends along an edge of the pixel electrode in a second direction crossing to the first direction, and the second edge electrode may be connected with different ends of the first edge electrode and extends along an edge of the pixel electrode in the first direction.

In accordance with one or more other embodiments, a liquid crystal display device may include a substrate; a gate line on the substrate and extending in a second direction crossing a first direction; a data line on the gate line, insulated from the gate line, and extending along the first direction; an insulation film on the data line; a pixel electrode on the insulation film and including a stem electrode extending along the second direction and a plurality of branch electrodes extending from the stem electrode, wherein the branch electrodes extend such that an angle between the stem electrode and each of the branch electrode increases as the branch electrodes approach a center of the stem electrode and the angle decreases as the branch electrodes approach an end of the stem electrode.

The pixel electrode may include a first edge electrode and a second edge electrode, the first edge electrode may be connected with different ends of the stem electrode and extends along an edge of the pixel electrode in the first direction, and the second edge electrode may be connected with different ends of the first edge electrode and extends along an edge of the pixel electrode in the second direction. The insulation film may include a first portion having an upper surface that is substantially flat and a second portion protruding in a direction crossing the upper surface of the first portion and partially overlapping the first edge electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
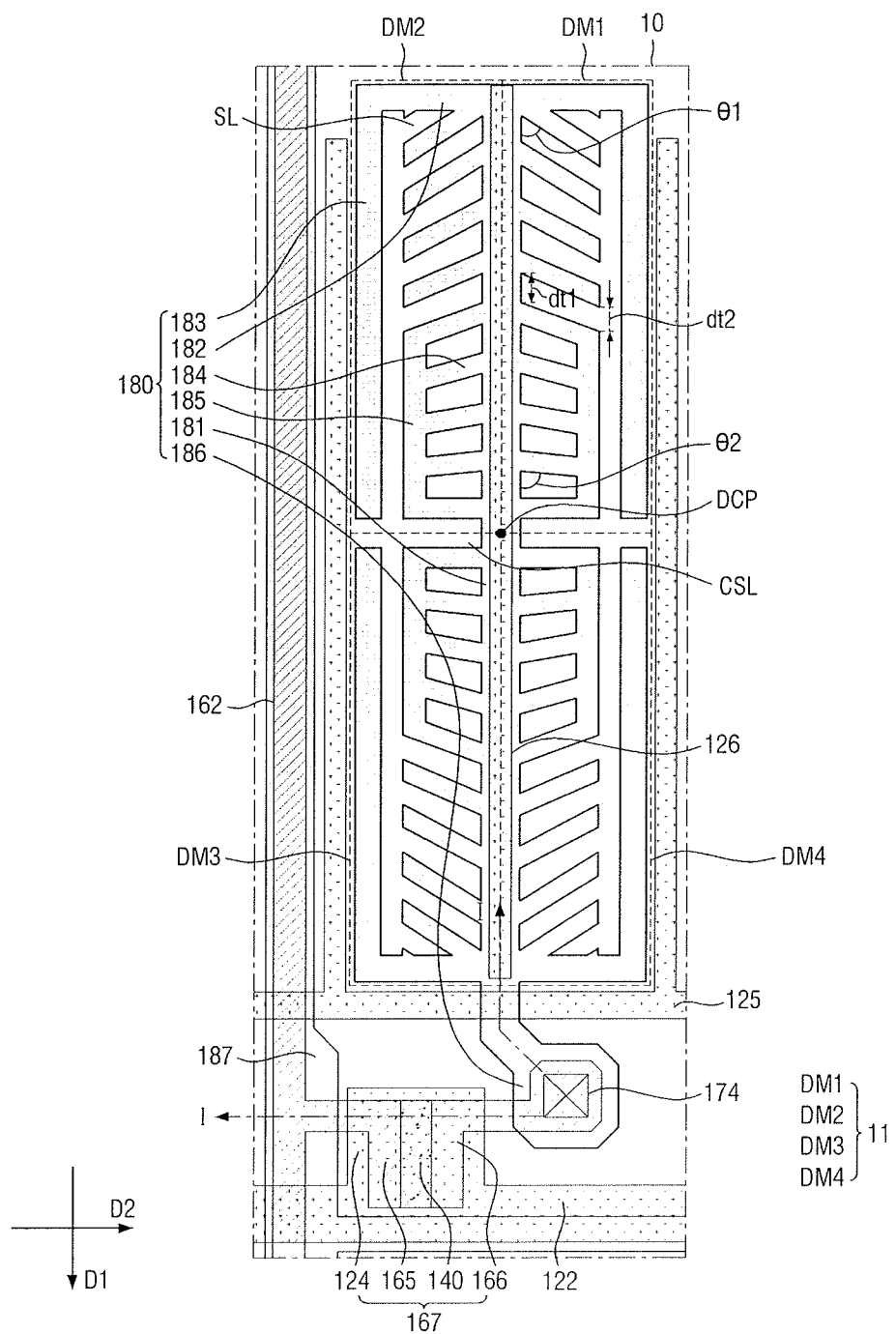
FIG. 1 illustrates an embodiment of a pixel of a liquid crystal display device.

Example embodiments will now be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
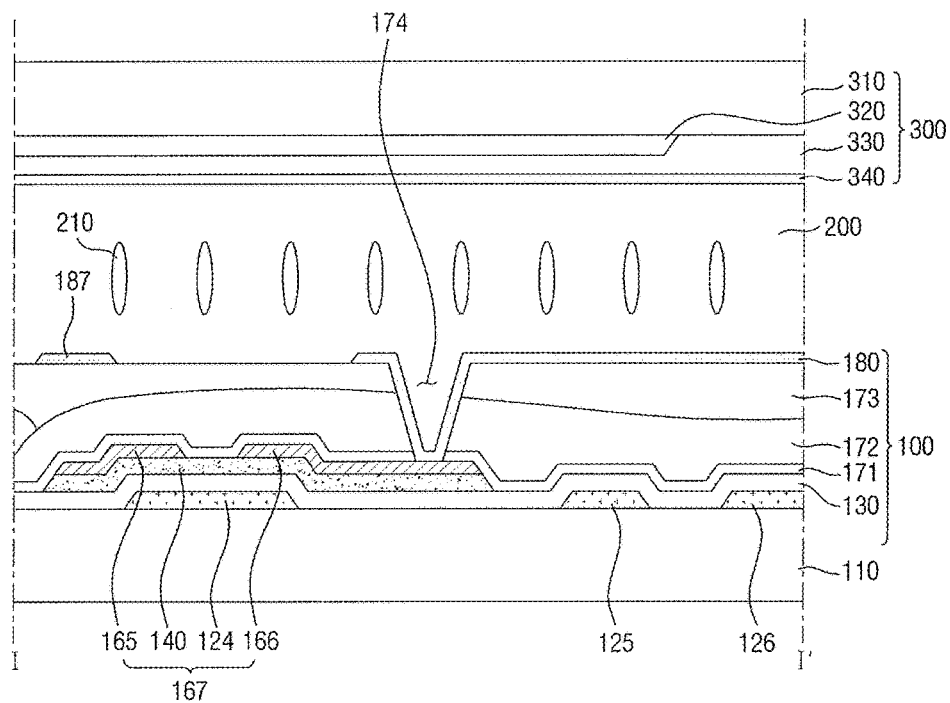
FIG. 2 illustrates a view taken along section line I-I' in FIG. 1.

FIG. 1 illustrates a layout embodiment of a pixel of a liquid crystal display device. FIG. 2 is a cross-sectional view taken along the line I-I' in FIG. 1.

Referring to FIGS. 1 and 2, the liquid crystal display device includes a first display panel 100, a liquid crystal layer 200, and a second display panel 300. In addition, the liquid crystal display device may include a pair of polarizers attached to the outer surfaces of the first display panel 100 and the second display panel 200.

The first display panel 100 includes a switching element (e.g., a thin film transistor 167) for driving liquid crystal molecules 210. The second display panel 300 faces the first display panel 100.

The liquid crystal layer 200 is between the first display panel 100 and the second display panel 300 and may include a plurality of liquid crystal molecules 210 having dielectric anisotropy. When an electric field is applied between the first display panel 100 and the second display panel 300, the liquid crystal molecules 210 rotate in a predetermined direction between the first display panel 100 and the second display panel 300, thereby blocking or transmitting light. The rotation may refer, for example, to a change in the arrangement of the liquid crystal molecules 210, as well as actual rotation of the liquid crystal molecules 210.

The liquid crystal display device includes a plurality of pixels 10 arranged in a matrix. Each pixel 10 may independently control the gray level of emitted light and may be a basic unit for expressing light of a specific color. Each pixel 10 includes an active area 11 to emit light of a color. In the active area 11, light incident on the lower portion of the first display panel 100 is transmitted to the upper portion of the second display panel 300.

The first display panel 100 includes a first base substrate 110, which may be a transparent insulation substrate. For example, the first base substrate 110 may be a glass substrate, a quartz substrate, or a transparent resin substrate. In some embodiments, the first base substrate 110 may be curved along one direction. In other embodiments, the first base substrate 110 may be flexible. The first base plate 110 may be deformed, for example, by rolling, folding, bending, or another manipulation.

The first base substrate 110 includes a gate line 122, a gate electrode 124, a holding line 125, and a light-blocking line 126. The gate line transmits a gate voltage for controlling the thin film transistor 167. The gate line 122 may have a shape extending in a second direction D2.

The second direction D2 is a direction perpendicular to a first direction D1, and one corresponding to a direction extending in parallel to one side of the first base substrate 110 on a plane in which the first base substrate 110 is disposed. The second direction D2, as shown in FIG. 1, may be defined as a direction indicated by any straight line extending from a right side to a left side. The first direction D1, as shown in FIG. 1, may be a direction indicated by any straight line extending from an upper side to a lower side.

The gate voltage is externally supplied and may have a changeable voltage level. The on/off operation of the thin film transistor 167 may be controlled based on the voltage level of the gate voltage.

The gate electrode 124 may have a shape protruding from the gate line 122 and may be physically connected with the gate line 122. The gate electrode 124 may be one component constituting the thin film transistor 167.

The holding line 125 is between the respective gate lines 122 and may extend along the second direction D2. In one embodiment, the holding line 125 may also extend along the edge of the active area 11. The holding line 125 may be adjacent to the edge of a pixel electrode 180. A predetermined capacitance may exist between the pixel electrode 180 and the holding line 125. Thus, it is possible to prevent a significant drop in the level of the voltage supplied to the pixel electrode 180. However, the holding line 125 may be omitted, for example, when the degree of the drop in the level of the voltage supplied to the pixel electrode does not have an adverse effect on display quality or is at an acceptable level without the holding line 125.

The light-blocking line 126 extends along the first direction D1 and may be physically separated from the gate line 122, the gate electrode 124, and the holding line 125. The light-blocking line 126 may overlap a stem electrode 181 of the pixel electrode 180 and may block the transmission of light in an area in which the light blocking line 126 is disposed. Therefore, it is possible to reduce or minimize light leakage that can occur along the stem electrode 181.

The light-blocking line 126 may maintain a floating state, e.g., a state in which an additional voltage is not applied. The light-blocking line 126 may be omitted in one embodiment. Further, in some embodiments, light blocking lines 126 are at the same position, but may be made of a material constituting a data line 162 for each layer.

Each of the gate line 122, the gate electrode 124, the holding line 125, and the light-blocking line 126 may be made of the same material. Each of the gate line 122, the gate electrode 124, the holding line 125 and the light-blocking line 126 may include, for example, an aluminum-based metal such as aluminum (Al) or an aluminum alloy, a silver-based metal, such as silver (Ag) or a silver alloy, a copper-based metal, such as copper (Cu), a copper alloy, a molybdenum-based metal, such as molybdenum (Mo) or a molybdenum alloy, chromium (Cr), tantalum (Ta), or titanium (Ti). Each of the gate line 122, the gate electrode 124, the holding line 125, and the light-blocking line 126 may have a single-layer structure or a multi-layer structure including at least two conductive films having different physical properties.

A first insulation film 130 is on the gate line 122, the gate electrode 124, the holding line 125 and the light-blocking line 126. The first insulation film 130 may include an insulating material, for example, silicon nitride or silicon oxide. The first insulation film 130 may have a single-layer structure or a multi-layer structure including at least two insulating films having different physical properties.

A semiconductor layer 140 is on the first insulation film 130. At least part of the semiconductor layer 140 may overlap the gate electrode 124. The semiconductor layer 140 may include, for example, amorphous silicon, polycrystalline silicon, or oxide semiconductor. The semiconductor layer 140 may overlap a data line 162, a source electrode 165 and a drain electrode 166, as well as the gate electrode 124.

In some embodiments, a resistive contact member may be additionally disposed on the semiconductor layer 140. The resistive contact member may include n+ hydrogenated amorphous silicon doped with n type impurities in a high concentration or may include silicide. A pair of the resistive members may be on the semiconductor layer 140. The resistive contact member may allow the source electrode 165, the drain electrode 166, and the semiconductor layer 140 to have ohmic contact characteristics. When the semiconductor layer 140 includes oxide semiconductor, the resistive contact member may be omitted.

The data line 162, the source electrode 165, and the drain electrode 166 are on the semiconductor layer 140 and the first insulation film 130. The data line 162 may extend in the first direction D1 to intersect the gate line 122. The data line 162 may be insulated from the gate line 122 and gate electrode 124 by the first insulation film 130.

The data line may provide a data voltage to the source electrode 165. The data voltage is externally provided and may have a changeable voltage level. The gray level of each pixel 10 may be controlled based on the voltage level of the data voltage. The source electrode 165 is branched from the data line 162, and at least a part of the source electrode 165 may overlap the gate electrode 124.

The drain electrode 166, as shown in FIG. 1, may be spaced apart from the source electrode 165 with the semiconductor layer 140 therebetween. At least a part of the drain electrode 166 may overlap the gate electrode 124.

As shown in FIG. 1, the source electrode 165 may have a bar shape spaced apart from the drain electrode 166 in parallel at a predetermined interval. In one embodiment, the source electrode 165 may have a C shape surrounding the drain electrode 166 at a predetermined interval.

Each of the data line 162, the source electrode 1165, and the drain electrode 166 may include the same material. Each of the data line 162, the source electrode 1165, and the drain electrode 166 may include, for example, aluminum, copper, silver, molybdenum, chromium, titanium, tantalum, or an alloy thereof. Each of the data line 162, the source electrode 1165, and the drain electrode 166 may have a multi-layer structure including, for example, a lower film made of a refractory metal and an upper film having low resistance.

The gate electrode 124, the semiconductor layer 140, the source electrode 165, and the drain electrode 166 may form a thin film transistor 167, which is a switching element.

A passivation film 171 is on the first insulation 130 and the thin film transistor 167. The passivation film 171 may include an inorganic insulating material and may cover the thin film transistor 167. The passivation film may protect the thin film transistor 167 and may prevent material in a color filter layer 172 and a second insulation film 173 from flowing into the semiconductor layer 140.

A color filter layer 172 is on the passivation film 171. The color filter layer 172 may include a photosensitive organic composition containing a pigment for expressing a color. The composition may contain, for example, one of red, green, or blue pigments. The color filter layer 172 may include a plurality of color filters. Each of the color filters may express, for example, one of red, green, or blue colors or one of cyan, magenta, yellow, or white colors.

A second insulation film 173 is on the color filter 172, may include an insulating material, and may be an organic film made of an organic material. The second insulation film 173 may flatten the local level differences caused by the constituents between the second insulation film 173 and the first base substrate 110. In other words, the upper surface of second insulation film 173 may be substantially flat.

A contact hole 174 exposing part of the thin film transistor 167 (e.g., part of the drain electrode 166 along a direction perpendicular to the upper surface of the first base substrate 110) may be formed in the passivation film 171, the color filter layer 172 and the second insulation film 173. The contact hole 174 may have a shape penetrating the passivation film 171, the color filter layer 172, and the second insulation film 173 along a direction perpendicular to the upper surface of the first base substrate 110. A pixel electrode 180 on part of the drain electrode and the second insulation film 173 may be physically connected with each other through the contact hole 174.

A pixel electrode 180 and a blocking electrode 187 may be on the second insulation film 173. The pixel electrode 180 and the blocking electrode 187 may be on the same plane to overlap each other. The pixel electrode 180 may be physically connected with the drain electrode 166 through the contact hole 174 and may receive the data voltage from the drain electrode 166. The pixel electrode 180 may be made of a transparent conductive material such as indium tin oxide (ITO), indium zinc oxide (IZO), indium tin zinc oxide (ITZO), or aluminum (Al)-doped zinc oxide (AZO).

The pixel electrode 180 may be in an active area 11. In one embodiment, the pixel electrode 180 may include an area extending to overlap the contact hole 174 (e.g., an extension area) in order to be connected with the drain electrode 166.

An area in which the pixel electrode 180 is disposed may be divided into a plurality of regions. For example, the area in which the pixel electrode is disposed may be divided into four regions. For example, the active area 11 may be divided into four regions. These four regions may respectively correspond to the four quartered regions of the active area 11. Among the four regions corresponding to the four quartered regions of the active area 11, the region at an right upper end is as a first domain DM1, the region at an left upper end is a second domain DM2, the region at a left lower end is a third domain DM3, and the region at a right lower end is a fourth domain DM4. The first domain DM1, the second domain DM2, the third domain DM2, and the fourth domain DM3 may have the same area and shape.

The pixel electrode 180 may have a shape which is line-symmetric with respect to a boundary line defining the first domain DM1 and the second domain DM2 or a boundary line defining the third domain DM3 and the fourth domain DM4. Further, the pixel electrode 180 may have a shape which is line-symmetric with respect to a boundary line defining the second domain DM2 and the third domain DM3 or a boundary line defining the first domain DM1 and the fourth domain DM4.

The pixel electrode 180 may include slits SL which are openings containing no transparent conductive material. The pixel electrode 180 is regularly patterned by the slits SLs. The direction and degree of the liquid crystal molecules 210 overlapping the pixel electrode 180 may be controlled depending on the shape and pattern of the pixel electrode 180.

The pixel electrode 180 includes a stem electrode 181, a first edge electrode 182, a second edge electrode 183, a branch electrode 184, a connection electrode 185, and an extension electrode 186. The respective components constituting the pixel electrode 180 may be in the active area 11. In one embodiment, the extension electrode 186 may be at least partially outside the active area 11.

The stem electrode 181 extends along the first direction D1 and may cross the active area 11. The stem electrode 181 may extend along a boundary between the first domain DM1 and the second domain D2 and a boundary between the third domain DM3 and the fourth domain DM4. The stem electrode 181 may bisect the active area 11 into an area in which the first domain DM1 and the fourth domain DM4 are disposed and an area in which the second domain DM2 and the third domain DM3 are disposed. The stem electrode 181 may be disposed such that a domain center point DCP is on a boundary line bisecting the stem electrode 181 into lower and upper parts.

The first edge electrode 182 may extend in the second direction D2 along the edge of the pixel 180 and may be connected with different ends of the stem electrode 181. For example, the pixel electrode 180 may include a plurality of first edge electrode 182. The pixel electrode 180 may include two first edge electrodes 182. As shown in FIG. 1, one first edge electrode 182 may be connected with the upper end of the stem electrode 181. The other first edge electrode 181 may be connected with the lower end of the stem electrode 181. For example, one first edge electrode 182 may extend in the second direction D2 along the upper edge of the first domain DM1 and the second domain DM2. The other first stem electrode 182 may extend in the second direction D2 along the lower edge of the third domain DM1 and the fourth domain DM2.

The second edge electrode 183 may extend in the first direction D1 along the edge of the pixel 180 and may be connected with different ends of the first edge electrode 182. For example, the pixel electrode 180 may include a plurality of second edge electrode 183. The pixel electrode 180 may include four second edge electrodes 183. As shown in FIG. 1, the two second edge electrodes 183 may extend from different ends of the first edge electrode 182 located thereover in parallel to the first direction D1. The other two second edge electrodes 183 may extend from different ends of the first edge electrode 182 located thereunder in parallel to the first direction D1.

In one embodiment, one second edge electrode 183 may extend in the second direction D2 along the right edge of the first domain DM1 and another second edge electrode 183 may extend in the second direction D2 along the left edge of the second domain DM2. Further, another second edge electrode 183 may extend in the second direction D2 along the left edge of the third domain DM3 and another second edge electrode 183 may extend in the second direction D2 along the right edge of the fourth domain DM4.

The branch electrodes 184 may extend from the stem electrode 181 in a direction oblique to the first direction D1, e.g., an oblique direction not parallel to the first direction D1. The respective branch electrodes 184 may extend from the first domain DM1, the second domain DM2, the third domain DM3 and the fourth domain DM4 in different directions.

In one embodiment, the branch electrodes 184 are near the center of the stem electrode 181. The branch electrodes 184 may extend such that the angle between the stem electrode 181 and each of the branch electrodes 184 increases. The branch electrodes 184 may be near the end of the stem electrode 181 and extend such that the angle between the stem electrode 181 and each of the branch electrodes 184 decreases.

The center of the stem electrode 181 may be a symmetric point at which the upper, lower, left, and right of the stem electrode 181 are symmetrical to each other. The center of the stem electrode 181 may match the domain center point DCP.

Further, the angle between the stem electrode 181 and the branch electrode 184 may be an angle between any straight line extending in parallel to the extending direction of the stem electrode 182 and any straight line extending in parallel to the extending direction of the branch electrode 184. The magnitude relation between the angles may be compared by the absolute values of the angles.

Further, the branch electrode 184 closest to the center of the stem electrode 181 may extend along a direction perpendicular to the extending direction of the stem electrode 181. For example, the branch electrode 184 closest to the center of the stern electrode 181 may extend in the second direction D2. In an embodiment, four branch electrodes 184 may be closest to the center of the stem electrode 181 and spaced apart from each other at regular intervals relative to each of the first domain DM1, the second domain DM2, the third domain DM3, and the fourth domain DM4. All of these branch electrodes 184 may extend along the second direction D2.

The extending direction of the respective branch electrodes 184 may be as follows. The branch electrode 184 closest to the center of the stern electrode 181 may extend along the second direction D2. The distance between the two adjacent branch electrodes spaced apart from each other may increase in a direction approaching the stem electrode 181 and may decrease in a direction approaching the end of the branch electrode 184.

In one embodiment, the distance between the two adjacent branch electrodes spaced apart from each other is a first length dt1 at the point at which each of the branch electrodes 184 start to extend. The distance between the two adjacent branch electrodes that are spaced apart may be measured along one side of the stem electrode 181. The distance between the edges of the two adjacent branch electrodes may be a second length dt2. The first length dt1 may be greater than the second length dt2.

In one embodiment, at the point of FIG. 1, the branch electrodes 104 may extend toward the right side or right lower end in the first domain DM1, may extend toward the left side or left lower end in the second domain DM2, may extend toward the left side or left upper end in the third domain DM2, and may extend toward the right side or right upper end in the fourth domain DM4.

The maximum value of the angles between the stem electrode 181 and the branch electrodes 184 may be 35° to 45°. The minimum value of the angles between the stem electrode 181 and the branch electrodes 184 may be 0° to 15°. In another embodiment, as the branch electrode 184 gets closer to the upper side of the first domain DM1, the angle (θ1) between this branch electrode 184 and the stem electrode 181 may decrease. As the branch electrode 184 gets closer to the lower side of the first domain DM1, the angle (θ2) between this branch electrode 184 and the stem electrode 181 may increase. Similarly, as the branch electrode 184 gets closer to the upper side of the second domain DM2, the angle between this branch electrode 184 and the stem electrode 181 may decrease. As the branch electrode 184 gets closer to the lower side of the second domain DM2, the angle between this branch electrode 184 and the stem electrode 181 may increase. The minimum and/or maximum values of the angles between the stem electrode 181 and the branch electrodes 184 may be different in other embodiments.

As the branch electrode 184 gets closer to the upper side of third domain DM3, the angle between this branch electrode 184 and the stem electrode 181 may decrease. As the branch electrode 184 gets closer to the lower side of third domain DM3, the angle between this branch electrode 184 and the stem electrode 181 may increase. As the branch electrode 184 gets closer to the upper side of the fourth domain DM4, the angle between this branch electrode 184 and the stem electrode 181 may decrease. As the branch electrode 184 gets closer to the lower side of fourth domain DM4, the angle between this branch electrode 184 and the stem electrode 181 may increase.

The branch electrode 184 at the lowermost side of the first domain DM1 may extend toward the right. The branch electrode 184 at the lowermost side of the second domain DM2 may extend toward the left. The branch electrode 184 at the uppermost side of the third domain DM3 may extend toward the left. The branch electrode 184 at the uppermost side of the fourth domain DM4 may extend toward the right.

The connection electrode 185 may serve to connect ends of some branch electrodes 184 and may extend in parallel to the first direction D1. For example, the connection electrode 185 may extend from the end of the branch electrode 184 closest to the domain center point DCP. As shown in FIG. 1, the connection electrode 185 may extend, for example, from the ends of the four branch electrodes closest to the domain center point DCP in a direction parallel to the first direction D1 and may connect the ends of the adjacent branch electrodes 184 with each other.

However, among the branch electrodes 184 connected by the connection electrode 185, only part of the branch electrodes 185 in the extending direction of the connection electrode 185 may be connected. But, not all of the branch electrodes 185 are connected, thereby improving visibility.

For example, the connection electrodes 185 may be respectively disposed, one-by-one, in the first domain DM1, the second domain DM2, the third domain DM3 and the fourth domain DM4. The connection electrode 185 in the first domain DM1 may extend upward from the end of the branch electrode 184 at the lowermost area of the first domain DM1. The connection electrode 185 in the second domain DM2 may extend upward from the end of the branch electrode 184 at the lowermost area of the second domain DM2. The connection electrode 185 in the third domain DM3 may extend downward from the end of the branch electrode 184 at the lowermost area of the second domain DM2. The connection electrode 185 in the fourth domain DM4 may extend downward from the end of the branch electrode 184 at the lowermost area of the second domain DM2.

The number of the branch electrodes 184 connected by the connection electrode 185 in each of the first domain DM1, the second domain DM2, the third domain DM3 and the fourth domain DM4 may be a predetermined percentage (e.g., 75% or less) of the number of the branch electrodes 184 in each of the first domain DM1, the second domain DM2, the third domain DM3, and the fourth domain DM4.

The extension electrode 186 extends to the outside of the active area 11. The extension electrode 186 may extend from the first edge electrode 182 and may overlap the contact hole 174. The extension electrode 186 may be physically connected with the drain electrode 166 through the contact hole 174 and may receive the data voltage. The data voltage supplied to the extension electrode 186 may be transmitted to the stem electrode 181, the first edge electrode 182, the second edge electrode 183, branch electrodes 184, and the connection electrode 185, which constitute the pixel electrode 180, through the extension electrode 186.

As described above, the slits SL, which are openings containing no transparent conductive material constituting the pixel electrode 180, are in the active area 11. The slits SL may be in the active area 11 along a region in which the transparent conductive material constituting the pixel electrode 180 is not contained. Among the slits SL, openings adjacent to the stem electrode 181 to respectively extend to the left and right of the domain center point DCP may be a central slit CSL. Since the transparent conductive material is not in the region with the central slit CSL, transmittance and visibility of the liquid crystal display device may be improved.

The blocking electrode 187 may be flush with the pixel electrode 180. The blocking electrode 187 may be spaced from the pixel electrode by a predetermined distance, so as not to come into contact with the pixel electrode 180 or overlap the pixel electrode 180. The blocking electrode 187 may not be physically and electrically connected with the pixel electrode 180. Thus, the data voltage supplied to the pixel electrode 180 may not be supplied to the blocking electrode 187.

The blocking electrode 187 may be made of a transparent conductive material (e.g., indium tin oxide (ITO), indium zinc oxide (IZO), indium tin zinc oxide (ITZO), or aluminum (Al)-doped zinc oxide (AZO)) and may be made of the same material as the pixel electrode 180. The blocking electrode 187 may overlap the residual region excluding a region in which a part of the pixel electrode 180 is disposed, in the area other than the active area 11. However, the blocking electrode may not always overlap the residual region excluding a region in which a part of the pixel electrode 180 is disposed, and may also overlap a part of the residual region.

The blocking electrode 187 may overlap the data line 162. The data voltage is supplied to the data line 162 in order to prevent the liquid crystal molecules 210 overlapping the data line 162 from being influenced by the change in voltage level of the data voltage, thereby preventing light leakage.

A first alignment film may be additionally disposed on the pixel electrode 180 and the blocking electrode 187. The first alignment film may control the initial alignment angle of the liquid crystal molecules 210 injected in liquid crystal layer 200.

The second display panel 300 includes a second base substrate 310, a light blocking member 320, an overcoat layer 330, and a common electrode 340. The second base substrate 310 faces the first base substrate 110 and may be sufficiently durable to withstand external impact. The second base substrate 310 may be, for example, a transparent insulating substrate. For example, the second base substrate 310 may be, for example, a glass substrate, a quartz substrate, or a transparent resin substrate. The second base substrate may be flattened or curved in a predetermined directions.

The light blocking member 320 is on one side of the second base substrate 310 facing the first display panel 100. The light-blocking member may overlap the gate line 122, the data line 162, the thin film transistor, and the contact hole 174 (to overlap an area other than the active area 11) and may block the transmission of light in an area other than the active area 11. In some embodiments, the light blocking member 320 may be in the residual region excluding a part of the data line 162 adjacent to the pixel electrode 180 in an area other than the active area 11. Part of the data line 162 overlapped by the light blocking member 320 may overlap the blocking electrode 187. Thus, transmission of light may be blocked.

The overcoat layer 330 is on one side of the light blocking member 320 facing the first display panel 100. The overcoat layer 330 may reduce the level' difference caused by the light blocking member 320. In some embodiments, the overcoat layer 330 may be omitted.

The common electrode 340 is on one side of the overcoat layer 330 facing the first display panel 100. The common electrode 340 may be made of a transparent conductive material, e.g., indium tin oxide (ITO), indium zinc oxide (IZO), indium tin zinc oxide (ITZO), or aluminum (Al)-doped zinc oxide (AZO).

The common electrode 340 may be formed over the entire surface of the second base substrate 310 in the form of stave. An external common voltage is applied to the common electrode 340 to form an electric field in the liquid crystal layer 200 together with the pixel electrode 180.

The common voltage may be externally supplied and the voltage level of the common voltage may be maintained constant during the operation of the liquid crystal display device. Thus, in the space between the pixel electrode 180 and the common electrode 340 which overlap each other, an electric field may be formed based on the difference in voltage level between the data voltage supplied to the pixel electrode 180 and the common electrode 340 and the common voltage. The liquid crystal molecules 210 may be rotated or inclined by this electric field.

In some embodiments, a voltage of the substantially same level as the common voltage may be supplied to the blocking electrode 187. Thus, during operation of the liquid crystal display device, an electric filed having an orientation may not be formed in part of the liquid crystal layer 200 between the blocking electrode 187 and the common electrode 340 disposed to overlap each other. The reason for this is that a potential difference is not generated because signals having the same voltage values are supplied to the blocking electrode 187 and the common electrode 340. Therefore, the liquid crystal molecules 210 in the space between the blocking electrode 187 and the common electrode 340, which overlap each other, may not be rotated or inclined and may be maintained in the same state as the state in which power of the liquid crystal display device is off. The liquid crystal molecules 210 may block transmission of light.

A second alignment film may be on one side of the common electrode 340 facing the first display panel 100. The second alignment film, similar to the first alignment film, may control the initial alignment angle of the liquid crystal molecules 210 injected into the liquid crystal layer 200.

The liquid crystal layer 200 includes a plurality of liquid crystal molecules having dielectric anisotropy and refractive anisotropy. The liquid crystal molecules 210 may be arranged in a direction perpendicular to the first display panel 100 and the second display panel 300 in a state in which an electric field is not formed in the liquid crystal layer 200. When an electric field is formed between the first display panel 100 and the second display panel 300, the liquid crystal molecules are rotated or inclined in a predetermined direction between the first display panel 100 and the second display panel 300, thereby changing the polarization of light.

Figure 3:
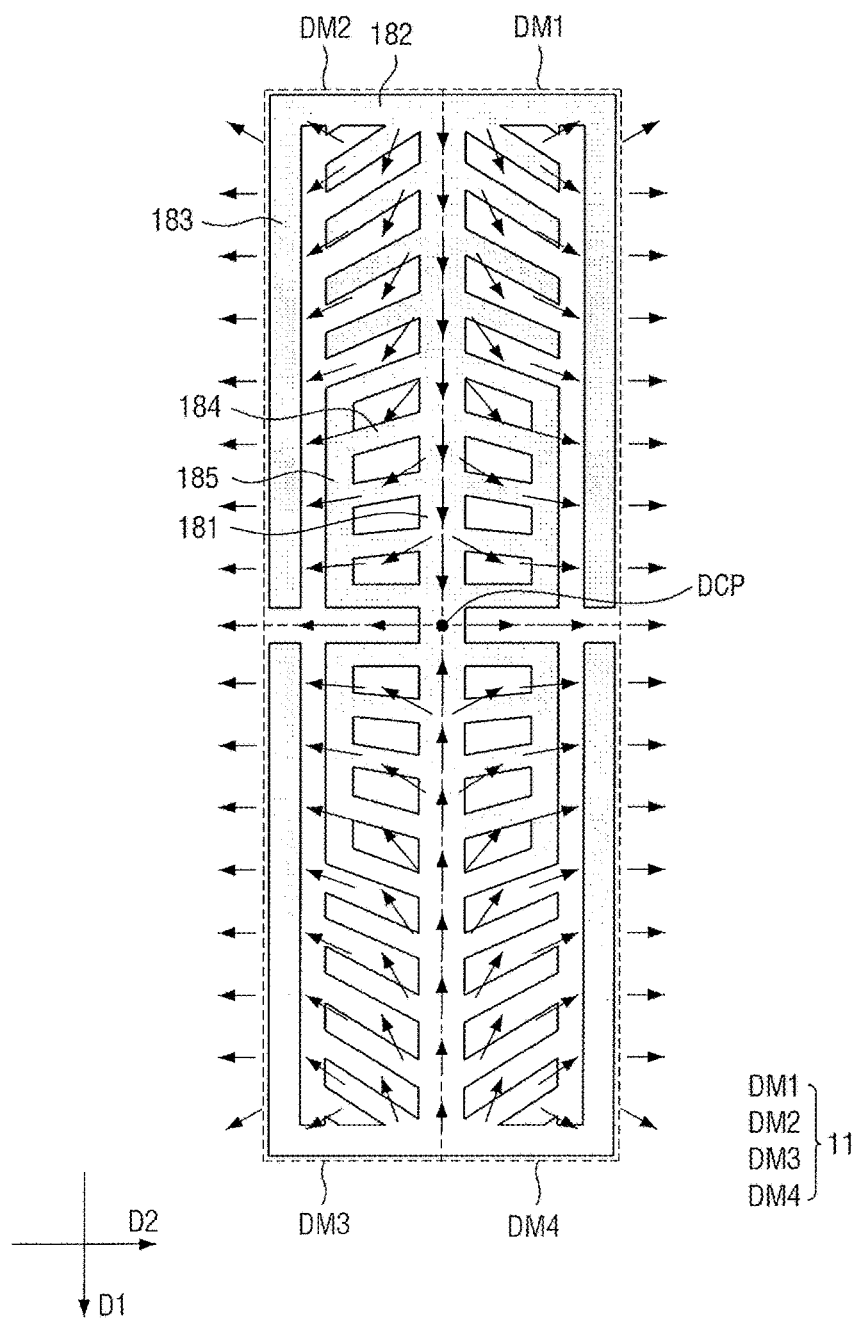
FIG. 3 illustrates an embodiment of a pixel electrode.

FIG. 3 illustrates an enlarged plan view of an embodiment of the pixel electrode in the active area in FIG. 1. The direction of each arrow in FIG. 3 indicates the inclination direction of the liquid crystal molecules 210 disposed to overlap the active area 11 when the data voltage is applied to the pixel electrode 180.

The length of each arrow indicates the degree of inclination of the liquid crystal molecules 210 disposed to overlap the active area 11 when the data voltage is applied to the pixel electrode 180. For example, the liquid crystal molecules 210 are relatively more inclined as the length of each arrow increases, and the liquid crystal molecules 210 are relatively less inclined as the length of each arrow decreases.

It may be assumed that the data voltage supplied to the pixel electrode 180 of FIG. 3 has a voltage level corresponding to the half gray level, not the low gray level and the high gray level, in order to reflect the characteristics in both the low gray level and the high gray level.

Referring to FIG. 3, when the data voltage is applied to the pixel electrode 180, the liquid crystal molecules 210 which overlap the stem electrode 181 may be inclined toward the domain center point DCP. For example, the liquid crystal molecules 210 along the boundary between the first domain DM1 and the second domain DM2 and the boundary between the third domain DM3 and the fourth domain DM4 may be inclined toward the domain center point DCP.

Further, the liquid crystal molecules 210 at different sides of the stem electrode 181 may be inclined in a direction away from the stem electrode 181. For example, the liquid crystal molecules 210 in the first domain DM1 may be inclined toward the right, the liquid crystal molecules 210 in the second domain DM2 may be inclined toward the left, the liquid crystal molecules 210 in the third domain DM3 may be inclined toward the left, and the liquid crystal molecules 210 in the fourth domain DM4 may be inclined toward the right.

In a region in which the second branch electrode 184 is disposed, the liquid crystal molecules 210 tend to be inclined in a direction parallel to the second direction D2. For example, the liquid crystal molecules 210 along the right edges of the first domain DM1 and the fourth domain DM4 may be inclined toward right. The liquid crystal molecules 210 along the left edges of the second domain DM2 and the third domain DM3 may be inclined toward the left. This phenomenon is an effect due to the disposition of the second branch electrode 184. In this case, visibility may be improved as the liquid crystal molecules 210 inclined in a direction parallel to the second direction D2 increase.

Further, it may be ascertained that the liquid crystal molecules 210 in the active area 11 are inclined in a direction parallel to the second direction D2 as they are close to the domain center point DCP. The degree of inclination of the liquid crystal molecules 210 increases. This phenomenon is an effect due to the disposition of the connection electrode 185 connecting the ends of the branch electrodes 184 adjacent to the domain center point DCP. As a result, visibility may be improved.

As other factors for inclining the liquid crystal molecules 210 in the active area 11 in a direction parallel to the second direction D2 as they are close to the domain center point DCP and increasing the degree of inclination of the liquid crystal molecules 210, it is exemplified that the branch electrodes 184 extend in a direction parallel to the second direction D2 as the extending direction of the branch electrodes 184 is closer to the domain center point DCP. Thus, visibility can be improved.

Figure 4:
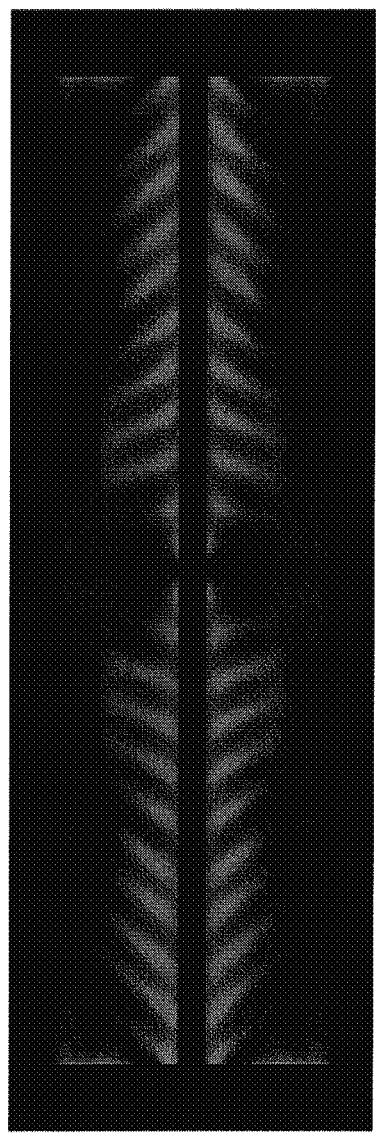
FIG. 4 illustrates a photograph of an active pixel area.
Figure 5:
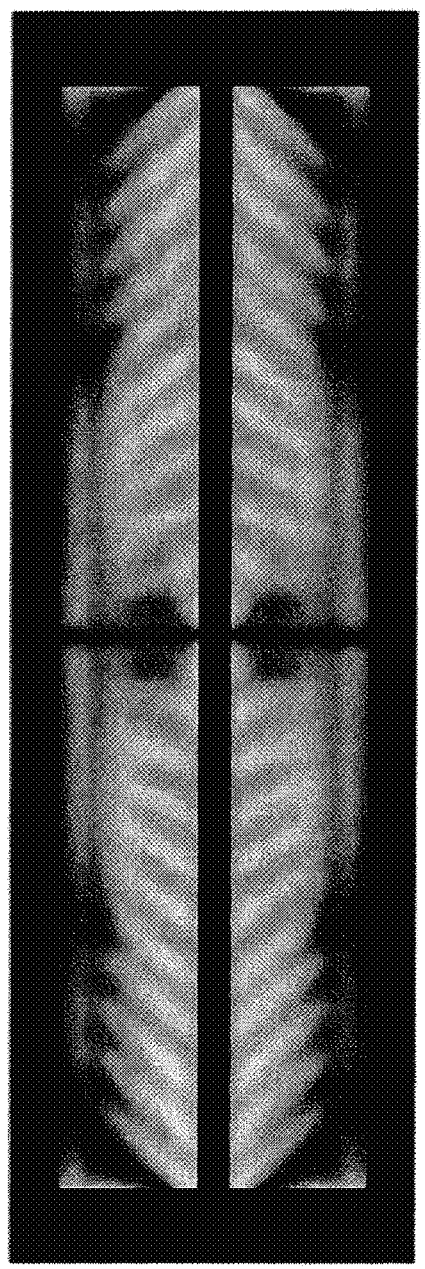
FIG. 5 illustrates another photograph of an active pixel area.
Figure 6:
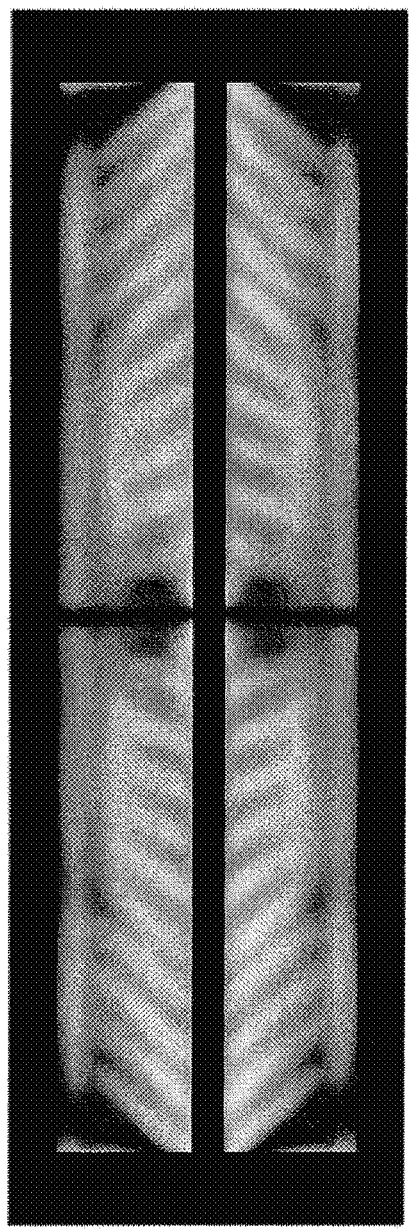
FIG. 6 illustrates another photograph of an active pixel area.

FIG. 4 illustrates a photograph of the active area when the data voltage corresponding to low gray level is applied to the pixel electrode 180 of FIG. 1. FIG. 5 illustrates a photograph of the active area when the data voltage corresponding to half gray level is applied to the pixel electrode 180 of FIG. 1. FIG. 6 illustrates a photograph of the active area when the data voltage corresponding to high gray level is applied to the pixel electrode 180 of FIG. 1. That is, FIGS. 4, 5 and 6 correspond to photographs of an observed active area 11. However, in the case of FIG. 4, the voltage level of the data voltage supplied to the pixel electrode 180 may be relatively low. In the case of FIG. 6, the voltage level of the data voltage supplied to the pixel electrode 180 may be relatively high.

Referring to FIG. 4, a region brighter than other regions at the low gray level appears in the form of rhomboid with respect to the center of the active area 11. For example, the region brighter than other regions at the low gray level coincides with a region in which the liquid crystal molecules 210 inclined in a direction adjacent to the second direction D2 are frequently distributed (e.g., refer to FIG. 3). Therefore, the characteristics of visibility at the low gray level may be improved.

Referring to FIG. 5, even a region away from the center of the active area is bright as the low gray level is changed to the half gray level.

Referring to FIG. 6, most of the active area 11 is bright at the high gray level. Therefore, the region viewed relatively dark at the low gray level is also viewed bright at the high gray level. Thus, characteristics of transmittance at the high gray level may be improved.

Figure 7:
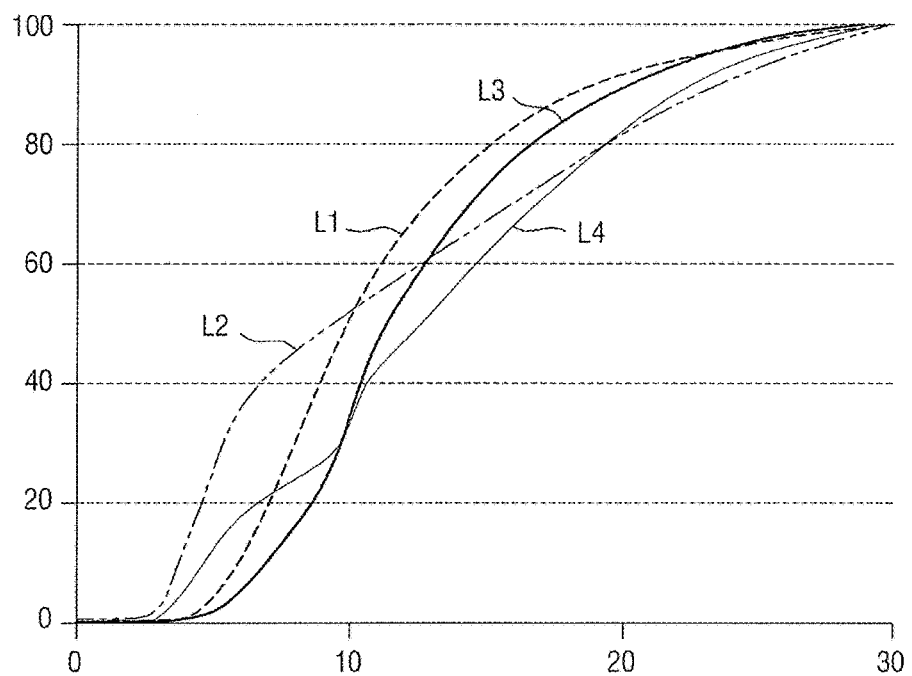
FIG. 7 illustrates transmittances of data voltages of an embodiment and a comparative example.

FIG. 7 illustrates a graph of transmittances of data voltages of an embodiment of a liquid crystal display and a liquid crystal display device of a comparative example for each voltage level. The embodiment of the liquid crystal display device includes pixel electrode 180 including a plurality of micro-electrode structures extending from the center point of a +-shaped electrode structure in all directions based on the +-shaped electrode structure. In the graph of FIG. 7, the X-axis represents a voltage level [unit: V], and the Y-axis represents transmittance [unit: %].

In FIG. 7, the first line L1 is a result of observing the liquid crystal display device according to a comparative example from the front. The second line L2 is a result of observing the liquid crystal display device according to the comparative example from the side. The third line L3 is a result of observing the liquid crystal display device according to the embodiment of FIG. 1 from the front. The fourth line L4 is a result of observing the liquid crystal display device according to the embodiment of FIG. 1 from the side.

Referring to FIG. 7, when comparing the first line L1 with the third line L3, the third line L3 moves right at the low gray level (illustratively, 2V to 5V), compared to the first line L1. Therefore, the liquid crystal display device according to the embodiment of FIG. 1 may exhibit various kinds of transmittances at the low gray level, compared to the liquid crystal display device of the comparative example.

Further, when comparing the difference in transmittance between the first line L1 and the second line L2 with the difference in transmittance between the third line L3 and the fourth line L4 at the low gray level, the difference in transmittance between the third line L3 and the fourth line L4 is less than the difference in transmittance between the first line L1 and the second line L2. Thus, in the case of the liquid crystal display device according to the embodiment of FIG. 1, the difference in brightness between the front and the side at the low gray level is relatively small, compared to the case of the liquid crystal display device of the comparative example. As a result, visibility of the liquid crystal display device according to the embodiment of FIG. 1 is improved compared to that of the liquid crystal display device of the comparative example.

Figure 8:
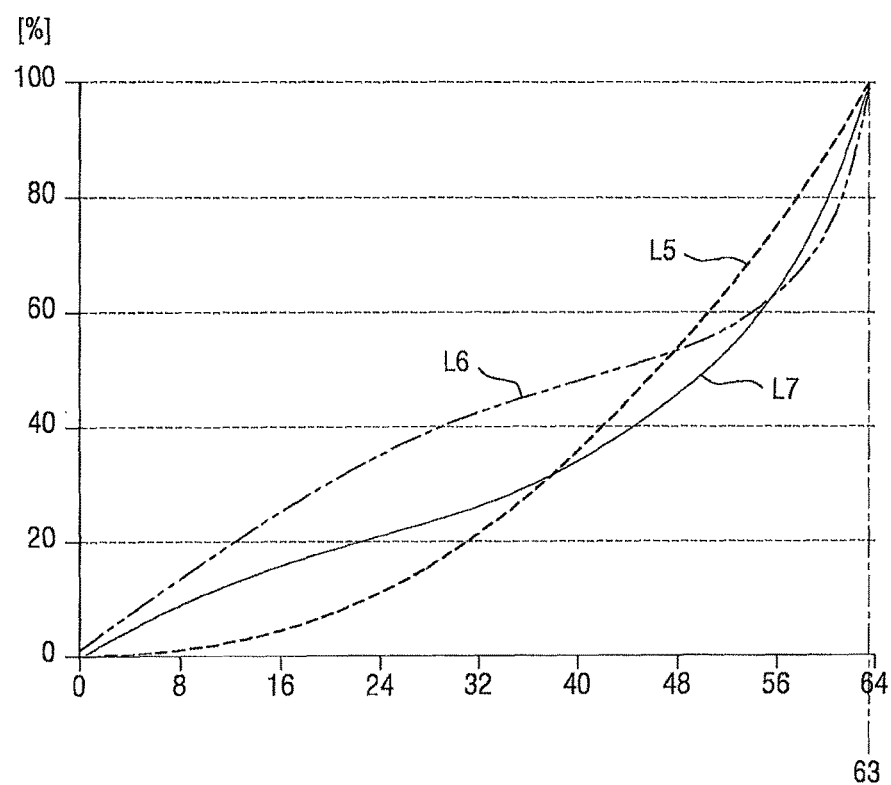
FIG. 8 illustrates visibility of a liquid crystal display of an embodiment and a comparative example.

FIG. 8 is a graph showing the degree of improvement of visibility of the liquid crystal display of the embodiment in FIG. 1 and a liquid crystal display device according to a comparative example. In the graph of FIG. 8, the X-axis represents the gray level of each pixel 10 and the Y-axis represents brightness (unit: %). In this graph, it is assumed that the maximum value of brightness corresponds to a case where a liquid crystal display device having a gray level of 63 is viewed from the front.

Referring to FIG. 8, the fifth line L5 represents the brightness with respect to gray level when the liquid crystal display device according to the comparative example viewed from the front. The sixth line L6 represents the brightness with respect to gray level when the liquid crystal display device according to the comparative example viewed from the side. The seventh line L7 represents the brightness with respect to gray level when the liquid crystal display device according to the embodiment of FIG. 1 in viewed from the side.

In this graph, visibility becomes good as the measured value of the brightness viewed from the side approximates the brightness viewed from the front. For example, visibility is best in the measured value of the brightness closest the fifth line L5 of the fifth line L5, the sixth line L6, and the seventh line L7. In the gray level value of 0 to 40 corresponding to a low gray level, visibility improves as the measured value of brightness becomes closer to the fifth line L5.

In the graph of FIG. 8, the measured value of the brightness closest the fifth line L5 corresponds to the seventh line L7. For example, in the gray level value of 0 to 40 corresponding to a low gray level, other measured values are maintained at low gray level values such that they are closer to the fifth line L5, compared to the sixth line L6. Therefore, visibility of the liquid crystal display device including the pixel electrode 180 in FIG. 1 may be best under a measurement condition according to seventh line L7.

Figure 9:
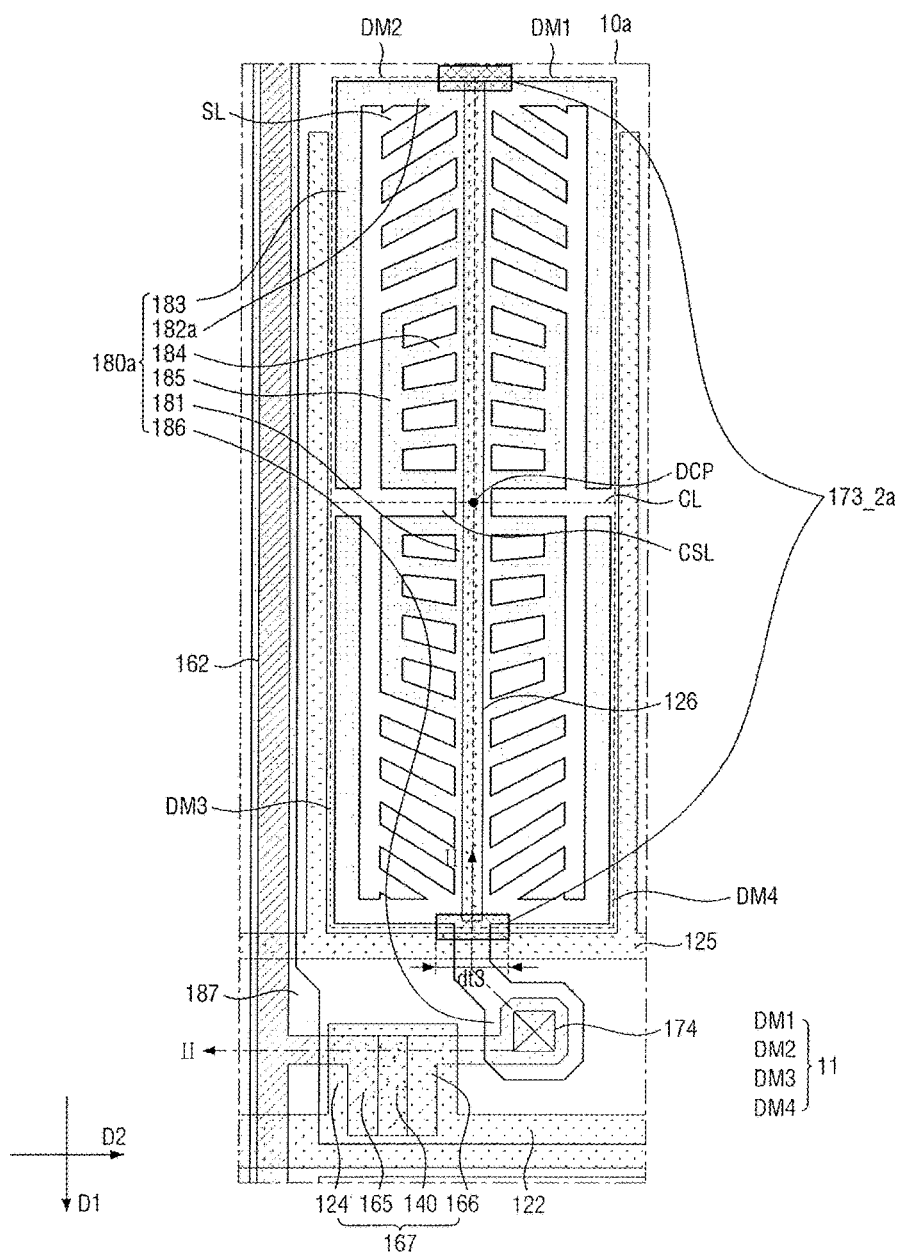
FIG. 9 illustrates another embodiment of a pixel.
Figure 10:
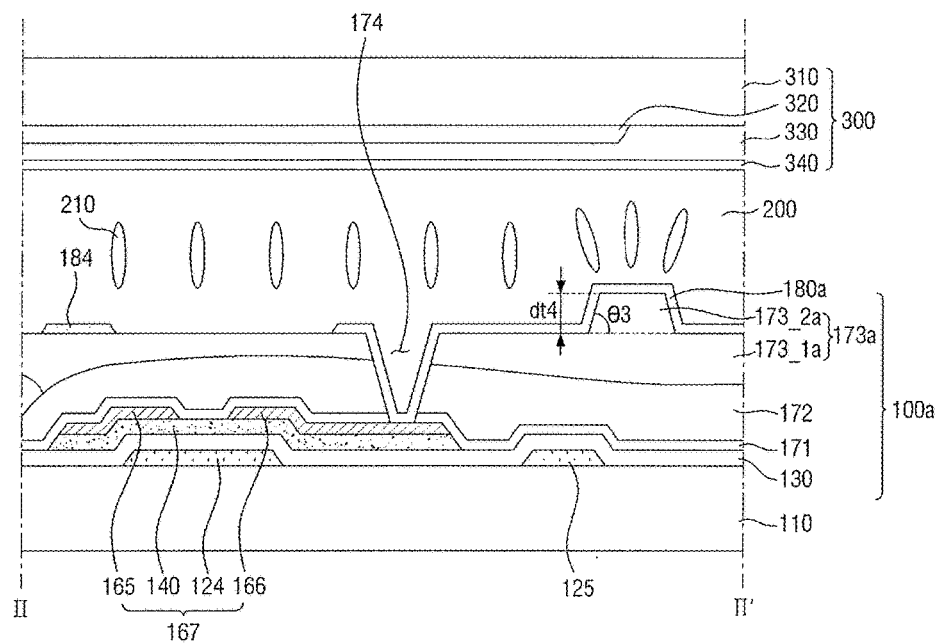
FIG. 10 illustrates a view taken along section line II-II' in FIG. 9.
Figure 11:
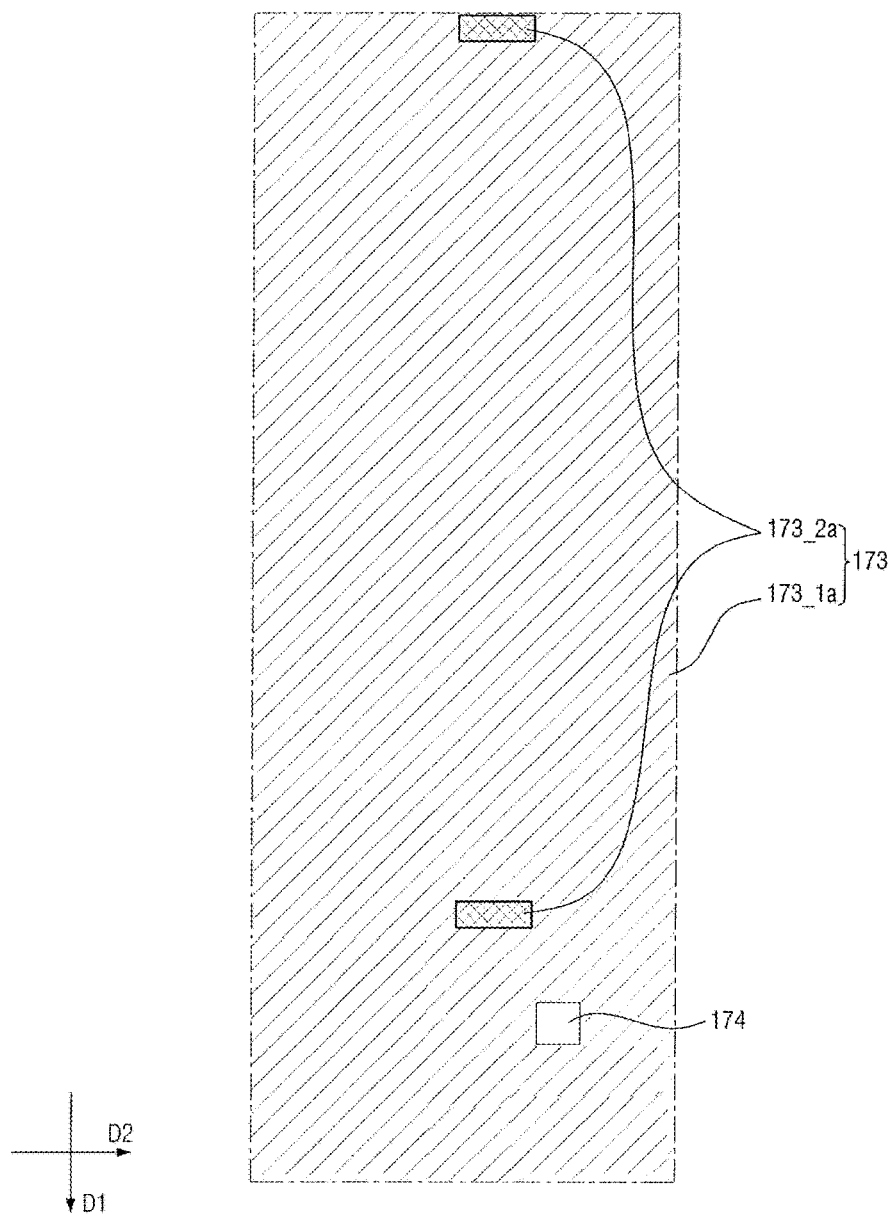
FIG. 11 illustrates an embodiment including a second insulation film.

FIG. 9 is another embodiment of a pixel of a liquid crystal display device. FIG. 10 is a cross-sectional view taken along line II-II' in FIG. 9. FIG. 11 is a plan view of a second insulation film in the pixel of the liquid crystal display device.

Referring to FIGS. 9 and 10, the pixel 10a of the liquid crystal display device may include a first base substrate 110, a gate line 122, a holding line 125, a first light-blocking line 126, a first insulation film 130, a data line 162, a thin film transistor 167, a passivation film 171, a color filter layer 172, a second insulation film 173a, a contact hole 174, a pixel electrode 180a, a blocking electrode 187, a common electrode 340, an overcoat layer 330, a light-blocking member 320, and a second base substrate 310.

In pixel 10a of the liquid crystal display device, the structure of the second insulation film 173a may be partially different from that in the aforementioned pixel (10 of FIG. 1) described with reference to FIGS. 1 and 2.

In this embodiment, the second insulation film 173a includes a first portion 173_1a and a second portion 173_2a. The first portion 173_1a may correspond to a position at which the second insulation film (173 of FIG. 2) in FIG. 2 is disposed. The upper surface of the first portion 173_1a may be substantially flat. For example, the first portion 173_1a may overlap most of the pixel 10a excluding an opening region in which the contact hole 174 is disposed.

The second portion 173_2a may protrude from the first portion 173_1a over the first base plate 110 and may only be in the specific region of the pixel 10a. The second portion 173_2a may be disposed such that a part of the second portion 173_2a overlaps the first edge electrode 182a. Since the first edge electrode 182a disposed to overlap the second portion 173_2a may be inclined in a direction perpendicular to the first base substrate 110, the liquid crystal molecules 210 overlapping the second portion 173_2a may be inclined in a specific direction or may be allowed to be easily inclined in a specific direction.

The second portion 173_2a may overlap the first edge electrode 182a on the extending line of the stem electrode 181 and may allow the liquid crystal molecules 210 overlapping the stem electrode 181 and the extending line thereof to be increasingly inclined toward the domain center point DCP. Thus, the control force of the pixel electrode 180a to the liquid crystal molecules 210 in the active areas 11 is enhanced, thereby improving visibility and transmittance of the liquid crystal display device.

The upper surface of the second portion 173_2a may be substantially flat. The later surface of the second portion 173_2a may be inclined. For example, the section of the second portion 173_2a cut in a specific direction may have a trapezoidal shape. Further, in FIG. 9, second portion 173_2a may have a rectangular shape.

The length dt3 of the second portion 173_2a extending along the second direction D2 may be 4 µm to 6 µm. The height dt4 of the section of the second portion 173_2a cut along the first direction D1 may be 1 µm to 2 µm. The section of the second portion 173_2a may have a trapezoidal shape in which the angle between lateral side and bottom side is, for example, 40° to 60°. When the above conditions are satisfied, transmittance and visibility may be improved.

The first portion 173_1a and the second portion 173_2a may be made of the same material and may be formed at the same time in process order. For example, the second portion 173_2a may be formed at the same time using a halftone mask for varying the irradiation amount of light with respect to each region, in the mask process of forming the contact hole 174 in the first display panel 100. Therefore, comparing the present embodiment with the embodiment in FIG. 1, since additional processes are not required, the second insulation film 173a according to the present embodiment may be manufactured without increasing costs.

Figure 12:
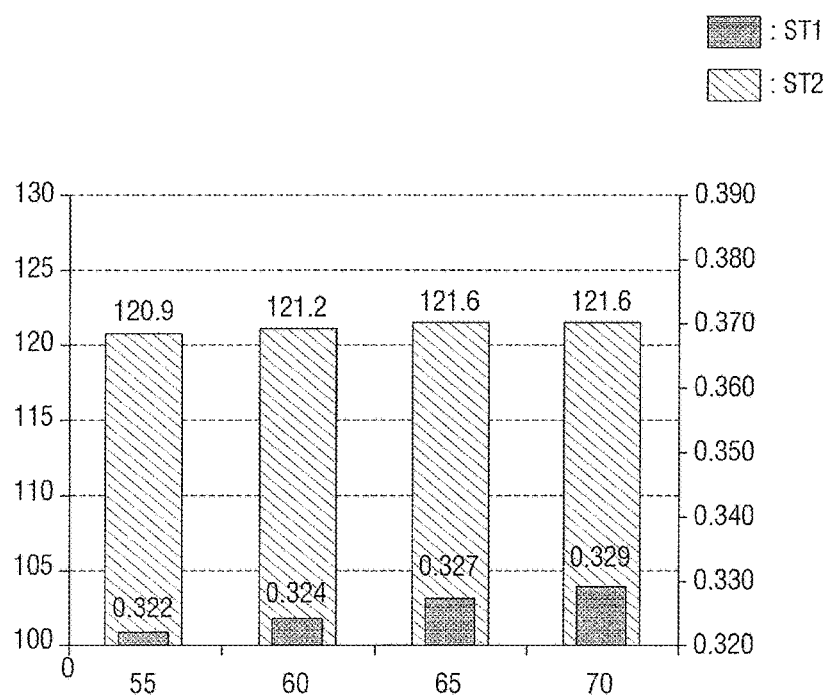
FIG. 12 illustrates transmittance and a visibility index for an embodiment.

FIG. 12 illustrates an embodiment of transmittance and a visibility index of the liquid crystal display device in FIGS. 9 to 11 with respect to the angle between the lateral side and bottom side of the second portion of the liquid crystal display device.

Referring the graph of FIG. 12, the values of the first bars ST1 represent relative transmittances (unit: %) viewing the liquid crystal display device according to this embodiment from the front, when the maximum transmittance is 100 viewing the liquid crystal display device according to the comparative example from the front.

Further, the values of the second bars ST2 represent the visibility indices of the liquid crystal display device according to this embodiment. As the visibility index reduces, the difference in brightness between the front and side of the liquid crystal display reduces and, also, visibility characteristics of the liquid crystal display device improve. Also, in the graph of FIG. 12, the X-axis represents an angle (unit:°) between the lateral side and bottom side of the second portion 173_2a in FIG. 10, the left Y-axis represent transmittance (unit: %), and the right Y-axis represent a visibility index value.

Referring to FIG. 12, as the angle (θ3) between the lateral side and bottom side of the section of the second portion 173_2a cut along the first direction D1 increases, transmittance increases but visibility index also increases. As a result, visibility characteristics becomes poor. Therefore, considering these values, when the angle (θ3) between the lateral side and bottom side of the second portion 173_2a is in a range of 40° to 80°, a liquid crystal display device having good characteristics in both transmittance and visibility can be manufactured.

Figure 13:
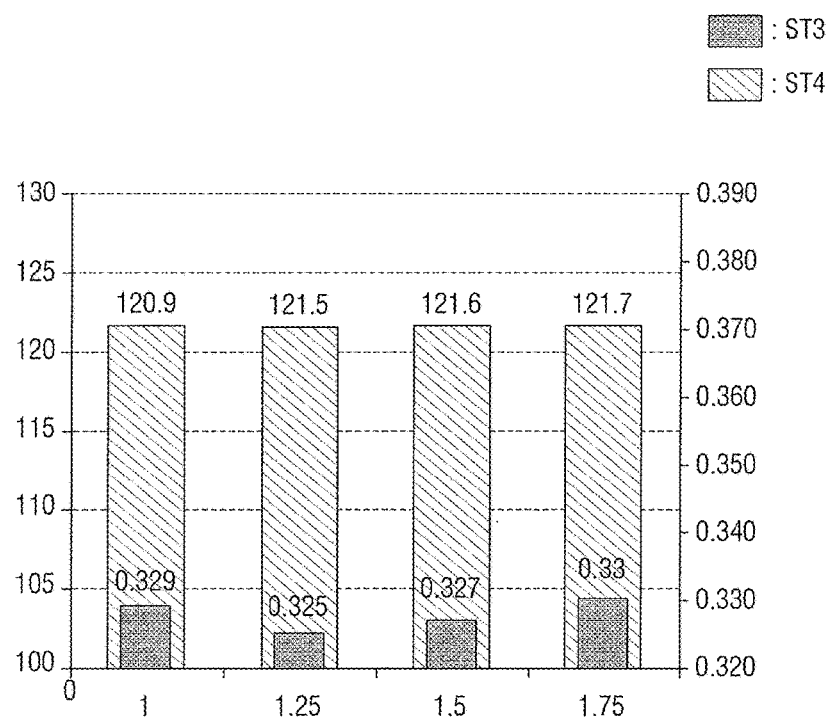
FIG. 13 illustrates transmittance and a visibility index for an embodiment.

FIG. 13 illustrates an embodiment of transmittance and a visibility index of the liquid crystal display device in FIGS. 9 to 11 with respect to the height of the second portion of the liquid crystal display device.

Referring to FIG. 13, the values of the third bars ST3 represent relative transmittances (unit: %) viewing the liquid crystal display device according to this embodiment from the front, when the maximum transmittance is 100 viewing the liquid crystal display device according to the comparative example from the front. Further, the values of the fourth bars ST4 represent visibility indices of the liquid crystal display device according to this embodiment. Further, the X-axis represents a height of the second portion 173_2a in FIG. 10, the left Y-axis represent transmittance (unit: %), and the right Y-axis represent a visibility index value.

Referring to FIG. 13, as the height dt4 of the second portion 173_2a increases, the visibility index decreases. Thus, visibility characteristics are good. However, when the height dt4 of the second portion 173_2a is shorter or longer than 1.25 μm, transmittance increases. Therefore, considering these values, when the height dt4 of the second portion 173_2a is in a range of 1 μm to 2 μm, a liquid crystal display device having good characteristics in both transmittance and visibility can be manufactured.

Figure 14:
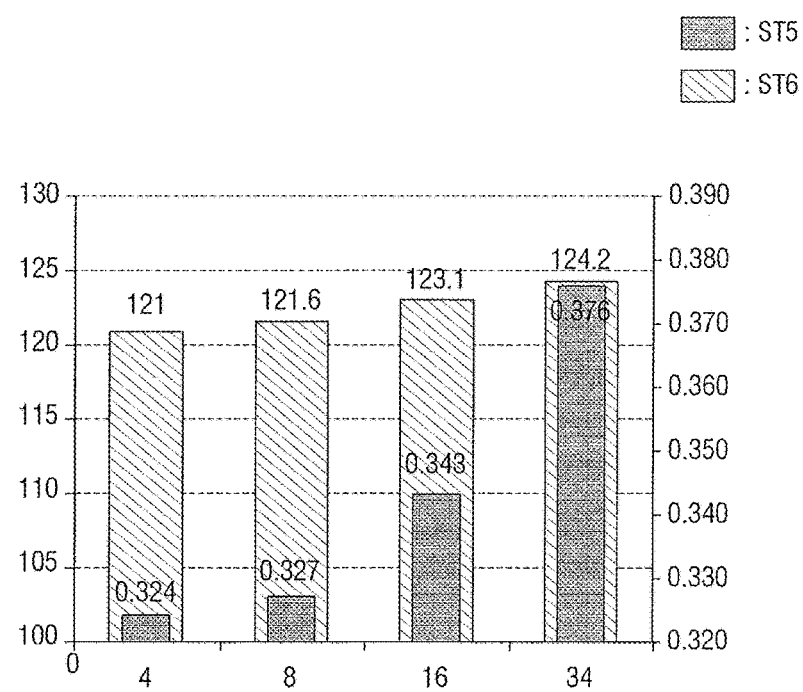
FIG. 14 illustrates transmittance and a visibility index for an embodiment.

FIG. 14 illustrates an embodiment of transmittance and a visibility index of the liquid crystal display device in FIGS. 9 to 11 with respect to the length of the second portion extending along the second direction of the liquid crystal display device. The values of the fifth bars ST5 represent relative transmittances (unit: %) viewing the liquid crystal display device from the front, when the maximum transmittance is 100 viewing the liquid crystal display device according to the comparative example from the front. Further, the values of the sixth bars ST6 represent the visibility indices of the liquid crystal display device according to this embodiment. The X-axis represents a length dt3 (unit: μm) of the second portion 173_2a extending along the second direction D2 in FIG. 9, the left Y-axis represent transmittance (unit: %), and the right Y-axis represents a visibility index value.

Referring to FIG. 14, as the length dt3 of the second portion 173_2a extending along the second direction D2 increases, transmittance increases but the visibility index also increases. Thus, visibility characteristics become poor. Therefore, considering these values, when the length dt3 of the second portion 173_2a extending along the second direction D2 is in a range of 4 μm to 6 μm, a liquid crystal display device having good characteristics in both transmittance and visibility can be manufactured.

Figure 15:
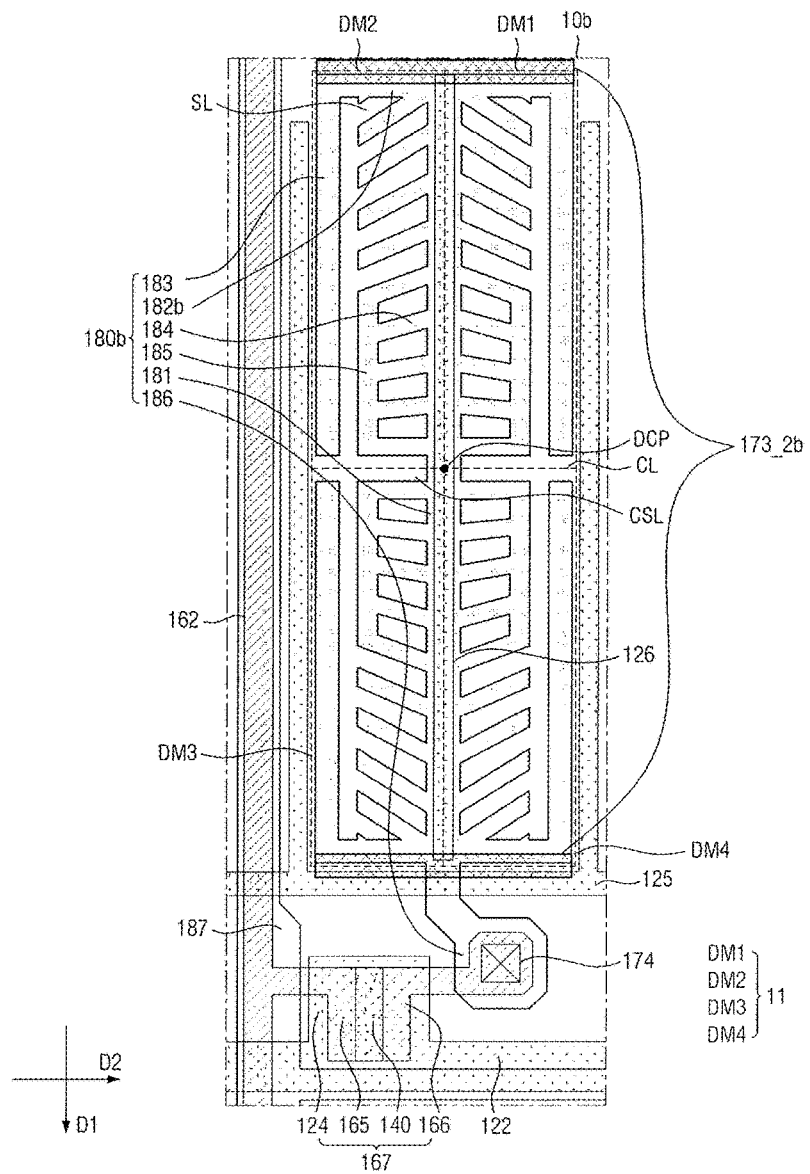
FIG. 15 illustrates another embodiment of a pixel.

FIG. 15 illustrates another embodiment of a pixel of a liquid crystal display device. Referring to FIG. 15, the pixel 10b of the liquid crystal display device may include a gate line 122, a holding line 125, a light-blocking line 126, a data line 162, a thin film transistor 167, a second portion 173_2b, a contact hole 174, a pixel electrode 180b, and a blocking electrode 187. In the pixel 10b of the liquid crystal display device according to this embodiment, the structure of the second portion 173_2b may be partially different from that in the aforementioned pixel (10a of FIG. 9) described with reference to FIGS. 9 to 11.

In this embodiment, the second portion 173_2b may overlap the entire one side of the active area 11. In one embodiment, the length of the second portion 173_2b extending along the second direction D2 may be equal to the width of the active area 11 in the second direction D2. In this case, maximum transmittance can be obtained.

Figure 16:
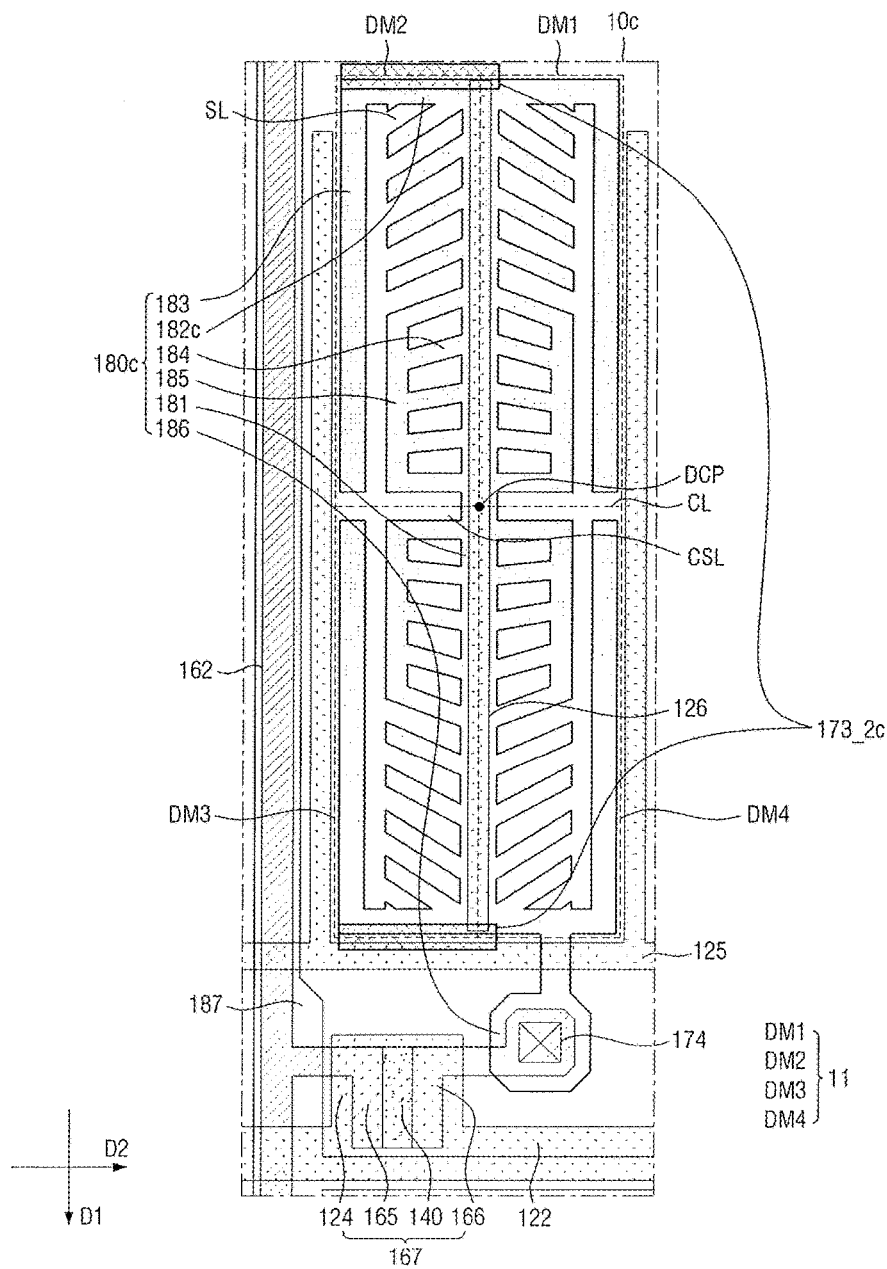
FIG. 16 illustrates another embodiment of a pixel.

FIG. 16 illustrates an embodiment of a pixel of a liquid crystal display device that may include a gate line 122, a holding line 125, a light-blocking line 126, a data line 162, a thin film transistor 167, a second portion 173_2c, a contact hole 174, a pixel electrode 180c, and a blocking electrode 187. In the pixel 10c of the liquid crystal display device according to this embodiment, the structure of the second portion 173_2c may be partially different from that in the pixel (10a of FIG. 9) described with reference to FIGS. 9 to 11.

In this embodiment, the second portion 173_2c may be asymmetrically formed in the active area 11, while being disposed on the extending line of the second stem electrode 181. For example, the second portion 173_2c may overlap part of the upper edge of the first domain DM1 and the entire upper edge of the second domain DM2. Also, the second portion 173_2c may overlap the entire lower edge of the third domain DM3 and part of the lower edge of the fourth domain DM4. Since the contact hole 174 of another pixel over the pixel 10c is disposed over the second domain DM2, and the contact hole 174 in the pixel 10c is under the fourth domain DM4, the influence receiving from the process of forming the contact hole 174 of the pixel 10c can be minimized according to the formation of the second portion 173_2c when the structure of the second portion 173_2c according to this embodiment is applied.

Figure 17:
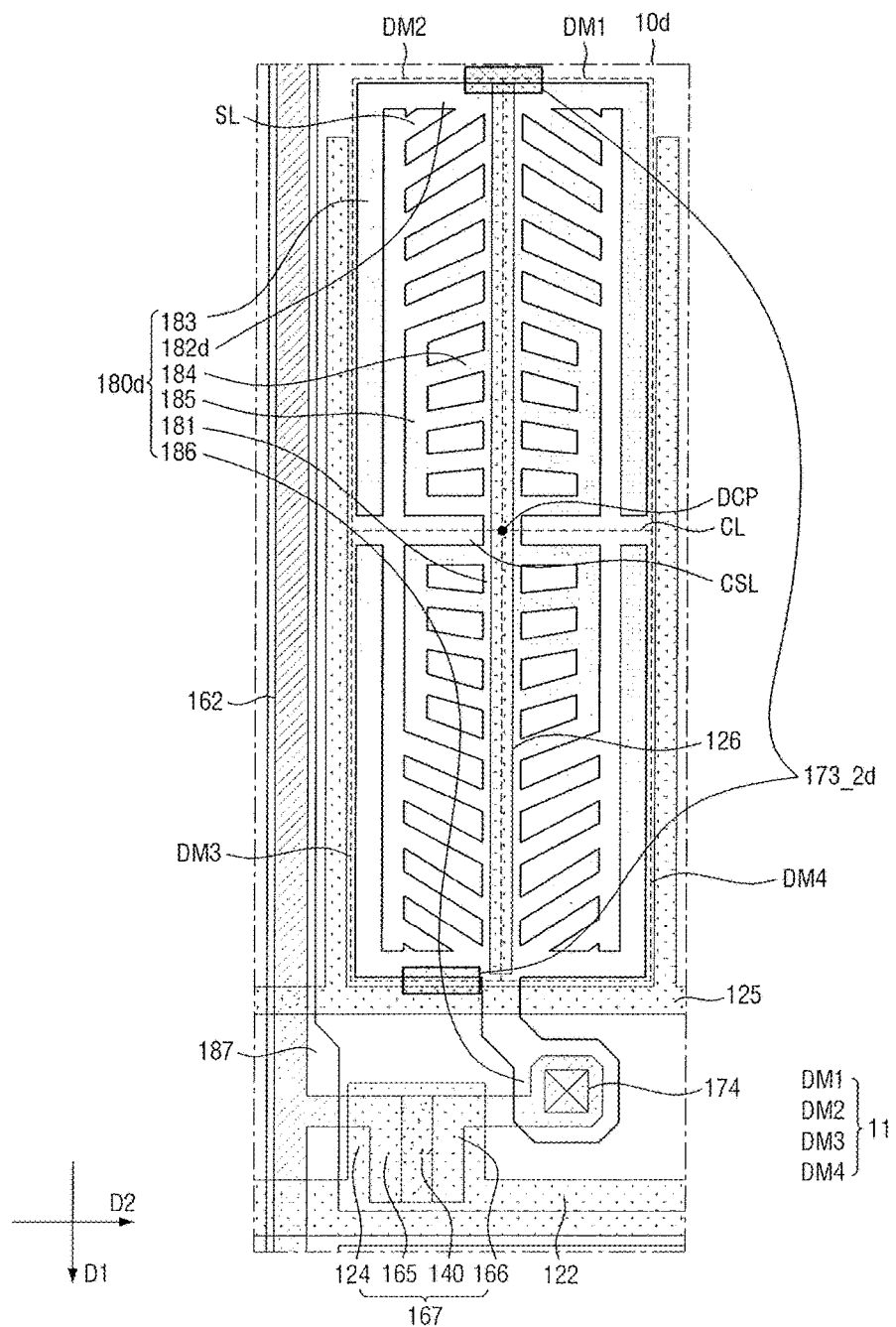
FIG. 17 illustrates another embodiment of a pixel.

FIG. 17 is another embodiment of a pixel 10d of a liquid crystal display device that may include a gate line 122, a holding line 125, a light-blocking line 126, a data line 162, a thin film transistor 167, a second portion 173_2d, a contact hole 174, a pixel electrode 180d, and a blocking electrode 187. In pixel 10d, the structure of the second portion 173_2d may be partially different from that in the pixel (10a of FIG. 9) in FIGS. 9 to 11.

In this embodiment, the second portion 173_2d may not be on the extending line of the second stem electrode 181 and may be not asymmetric with respect to a cross line CL. For example, one second portion 173_2d may overlap the boundary between the upper edge of the first domain DM1 and the upper edge of the second domain M2. The other second portion 173_2d may overlap only the lower edge of the third domain DM3. Since the contact hole 174 of the pixel 10d is adjacent to the lower side of the fourth domain DM4, influence of the second portion 173_2d on the contact hole 174 can be reduced or minimized.

Figure 18:
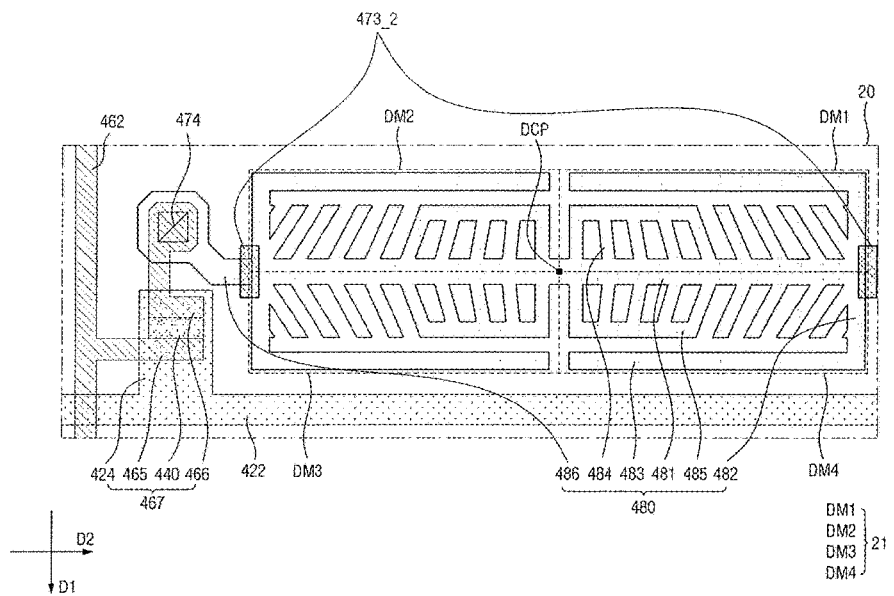
FIG. 18 illustrates another embodiment of a pixel.

FIG. 18 illustrates another embodiment of a pixel 20 of a liquid crystal display device which may include a gate line 422, a data line 462, a thin film transistor 467, a second portion 473_2, a contact hole 474, and a pixel electrode 480. The pixel 20 may be partially different from each of the pixels 10 and 10a in FIGS. 1, 2, and 9.

First, in the aforementioned embodiments, the major axis of each of the pixel electrodes 180 and 180a extends along the first direction D1. In the present embodiment, the major axis of the pixel electrode 480 may extend along the second direction D2.

For example, the pixel electrode 480 includes a stem electrode 481, branch electrodes 484, a first edge electrode 482, a second edge electrode 483, a connection electrode 485, and an extension electrode 486. The stem electrode 481 may extend along the second direction D2. The branch electrodes 484 may extend from the stem electrode 481. As the branch electrodes 484 approach the center of the stem electrode 481, the branch electrodes 484 may extend such that the angle between the stem electrode 481 and each of the branch electrodes 484 is relatively large. As the branch electrodes 484 approach the end of the stem electrode 181, the branch electrodes 484 may extend such that the angle between the stem electrode 481 and each of the branch electrodes 484 is relatively small.

The first edge electrode 482 may be connected with different ends of the stem electrode 481 and may extend in the first direction D1 along the edge of the pixel electrode 480. The second edge electrode 483 may be connected with different ends of the first edge electrode 482 and may extend in the second direction D2 along the edge of the pixel electrode 480. Further, the connection electrode 485 may extend in the second direction D2 from the end of the branch electrode 484 closest to the domain center point DCP.

For example, the pixel electrode 480 according to this embodiment may have a configuration obtained by rotating the pixel electrode 180 according to the embodiment of FIG. 1 by 90° in the clockwise direction. Therefore, the control direction of the liquid crystal molecules 210 by the pixel electrode 480 according to this embodiment may correspond to a direction obtained by rotating the control direction of the liquid crystal molecules 210, having described with reference to FIG. 3, by 90° in the clockwise direction. As a result, visibility may be improved.

The pixel electrode 180 according to FIG. 1 may be similar to the pixel electrode 480 of this embodiment in other respects.

The pixel 20 according to this embodiment may further include a second portion 473_2. The second portion 473_2 may partially overlap the first edge electrode 482. However, unlike the aforementioned second portion 173_2a in FIG. 9 which extends along the second direction D2, the second portion 473_2 according to the present embodiment may extend along the first direction D1.

Also, when the major axis of the pixel electrode 480 extends along the second direction D2, the major axis of the pixel 20 may also extend along the second direction D2. As a result, manufacturing costs of the liquid crystal display device can be reduced.

For example, as in the pixel 20 according to this embodiment, when the major axis of the pixel 20 extends along the second direction D2, the number of the pixels 20 along the first direction D1 increases and the number of the pixels 20 along the second direction D2 decreases. Therefore, the number of the gate lines 422 extending along the second direction D2 increases, and the number of the data lines 462 extending along the first direction D1 decreases. Consequently, the number of gate drive units to provide signals to the gate lines 422 increases, and the number of data drive units to provide signals to the data lines 462 decreases. Since the manufacturing costs of the gate drive unit may be greater than the manufacturing costs of the data drive unit, costs can be reduced.

In accordance with one or more of the aforementioned embodiments, a liquid crystal display device having improved visibility can be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display device, comprising:
   a substrate; and
   a pixel electrode on the substrate and including:
      a stem electrode extending along a first direction, outermost ends of the stem electrode being spaced apart from each other along the first direction, and a center of the stem electrode being a center point between the outermost ends of the stem electrode, and
      a plurality of branch electrodes extending from the stem electrode, at least some of the plurality of branch electrodes having first ends connected to the stem electrode and second ends, opposite the first ends, wherein the at least some of the plurality of branch electrodes are inclined toward the center of the stem electrode to define angles between the first ends and the stem electrode,
      wherein the plurality of branch electrodes extends such that the angles between the first ends and the stem electrode increase as the plurality of branch electrodes approaches the center of the stem electrode.

2. The liquid crystal display device as claimed in claim 1, wherein:
   all the plurality of branch electrodes are directly connected to the stem electrode, and
   a first branch electrode of the plurality of branch electrodes is closest to the center of the stem electrode, the first branch electrode extending in a second direction crossing the first direction.

3. The liquid crystal display device as claimed in claim 2, wherein:
   all the plurality of branch electrodes, except the first branch electrode, are inclined toward the center of the stem electrode to have the angles between the first ends and the stem electrode, and
   a minimum angle between the stem electrode and each of the inclining branch electrodes is 0° to 15° and a maximum angle therebetween is 35° to 45°.

4. The liquid crystal display device as claimed in claim 1, wherein:
the pixel electrode includes a connection electrode connected to and extending from a branch electrode of the plurality of branch electrodes that is closest to the center of the stem electrode, the connection electrode extending in the first direction, and
the connection electrode connects second ends of only some of the plurality of branch electrodes to each other.

5. The liquid crystal display device as claimed in claim 1, wherein:
the pixel electrode includes a plurality of first edge electrodes and a plurality of second edge electrodes,
the first edge electrodes are connected with the outermost ends of the stem electrode, respectively, the first edge electrodes extending along edges of the pixel electrode in a second direction crossing the first direction, and
the second edge electrodes are connected with different ends of the first edge electrodes and extend along edges of the pixel electrode in the first direction.

6. The liquid crystal display device as claimed in claim 5, further comprising:
an insulation film between the substrate and the pixel electrode,
wherein the insulation film includes a first portion having an upper surface that is substantially flat and a second portion protruding in a direction crossing the upper surface of the first portion and partially overlapping the first edge electrodes.

7. The liquid crystal display device as claimed in claim 6, further comprising:
a gate line and a data line between the substrate and the insulation film and insulated from each other, wherein the gate line extends in a second direction crossing the first direction, and wherein the data line extends in the first direction.

8. The liquid crystal display device as claimed in claim 6, wherein the second portion is on an extension line of the stem electrode.

9. The liquid crystal display device as claimed in claim 6, wherein a cross-section of the second portion of the insulation film along the first direction has a trapezoidal shape having an upper surface that is substantially flat, and a top view of the second portion of the insulation film has a rectangular shape.

10. The liquid crystal display device as claimed in claim 9, wherein:
in the cross-section of the second portion of the insulation film along the first direction, a length of a bottom side is 4 μm to 6 μm, a height is 1 μm to 2 μm, and an angle between a lateral side and the bottom side is 40° to 80°.

11. The liquid crystal display device as claimed in claim 1, wherein:
the pixel electrode is divided into first to fourth quadrants having a same shape, the first quadrant defining a first domain at a right upper end, the second quadrant defining a second domain at a left upper end, the third quadrant defining a third domain at a left lower end, and the fourth quadrant defining a fourth domain at a right lower end, and
first branch electrodes of the plurality of branch electrodes in the first domain extend toward the right lower end, second branch electrodes of the plurality of branch electrodes in the second domain extend toward the left lower end, third branch electrodes of the plurality of branch electrodes in the third domain extend toward the left upper end, and fourth branch electrodes of the plurality of branch electrodes in the fourth domain extend toward the right upper end.

12. The liquid crystal display device as claimed in claim 11, wherein:
the pixel electrode includes a connection electrode connecting second ends of some of the plurality of branch electrodes to each other, and
the connection electrode extends upward from a branch electrode of the first branch electrodes at a lowermost end of the first domain, extends upward from a branch electrode of the second branch electrodes at a lowermost end of the second domain, extends downward from a branch electrode of the third branch electrodes at an uppermost end of the third domain, and extends downward from a branch electrode of the fourth branch electrodes at an uppermost end of the fourth domain.

13. The liquid crystal display device as claimed in claim 11, wherein a number of branch electrodes of the plurality of branch electrodes connected by the connection electrode in each of the first to fourth domains is 75% or less than a total number of branch electrodes of the plurality of branch electrodes in each of the first to fourth domains.

14. A liquid crystal display device, comprising:
a substrate; and
a pixel electrode on the substrate and including:
a stem electrode extending along a first direction, and
a plurality of branch electrodes extending from the stem electrode,
wherein a branch electrode of the plurality of branch electrodes closest to a center of the stem electrode in the first direction extends in a second direction crossing the first direction,
wherein two adjacent branch electrodes of the plurality of branch electrodes are spaced apart from each other by a first length at a point at which the two adjacent branch electrodes contact the stem electrode,
wherein the two adjacent branch electrodes are spaced apart by a second length at distal ends thereof, and
wherein the first length is greater than the second length.

15. The liquid crystal display device as claimed in claim 14, wherein:
a distance between the two adjacent branch electrodes spaced apart from each other along the first direction increases approaching the stem electrode and decreases approaching the distal ends of the branch electrodes.

16. The liquid crystal display device as claimed in claim 14, wherein:
the pixel electrode includes a connection electrode connecting distal ends of only some of the branch electrodes to each other, the connection electrode extending in the first direction, and
the connection electrode extends from a branch electrode of the plurality of branch electrodes closest to the center of the stem electrode.

17. The liquid crystal display device as claimed in claim 14, wherein:
the pixel electrode includes a first edge electrode and a second edge electrode,
the first edge electrode is connected with different ends of the stem electrode and extends along an edge of the pixel electrode in a second direction crossing the first direction, and
the second edge electrode is connected with different ends of the first edge electrode and extends along an edge of the pixel electrode in the first direction.

18. A liquid crystal display device, comprising:
a substrate;
a gate line on the substrate and extending in a second direction crossing a first direction;
a data line on the gate line, insulated from the gate line, and extending along the first direction;
an insulation film on the data line; and
a pixel electrode on the insulation film and including:
  a stem electrode extending along the second direction, outermost ends of the stem electrode being spaced apart from each other along the second direction, and
  a plurality of branch electrodes extending from the stem electrode, at least some of the plurality of branch electrodes having first ends connected to the stem electrode and second ends, opposite the first ends, wherein the at least some of the plurality of branch electrodes are inclined toward a center of the stem electrode to define angles between the first ends and the stem electrode, and the center of the stem electrode being a center point between the outermost ends of the stem electrode,
  wherein the plurality of branch electrodes extend such that the angles between the first ends and the stem electrode increase as the plurality of branch electrodes approaches the center of the stem electrode and decrease as the plurality of branch electrodes approaches one of the outermost ends of the stem electrode.

19. The liquid crystal display device as claimed in claim 18, wherein:
  the pixel electrode includes a first edge electrode and a second edge electrode,
  the first edge electrode is connected with different ends of the stem electrode and extends along an edge of the pixel electrode in the first direction, and
  the second edge electrode is connected with different ends of the first edge electrode and extends along an edge of the pixel electrode in the second direction.

20. The liquid crystal display device as claimed in claim 19, wherein the insulation film includes a first portion having an upper surface that is substantially flat and a second portion protruding in a direction crossing the upper surface of the first portion and partially overlapping the first edge electrode.

* * * * *